(12) United States Patent
Miller

(10) Patent No.: US 9,489,419 B2
(45) Date of Patent: Nov. 8, 2016

(54) SYSTEM AND METHOD FOR OPTIMIZING BUSINESS PERFORMANCE WITH AUTOMATED SOCIAL DISCOVERY

(71) Applicant: Edwin Andrew Miller, Leesburg, VA (US)

(72) Inventor: Edwin Andrew Miller, Leesburg, VA (US)

(73) Assignee: 9Lenses, Inc., Sterling, VA (US)

( * ) Notice: Subject to any disclaimer, the term of this patent is extended or adjusted under 35 U.S.C. 154(b) by 12 days.

(21) Appl. No.: 14/030,815

(22) Filed: Sep. 18, 2013

(65) Prior Publication Data

US 2015/0206074 A1   Jul. 23, 2015

(51) Int. Cl.
*G06F 17/30*   (2006.01)
*G06Q 10/06*   (2012.01)

(52) U.S. Cl.
CPC ....... *G06F 17/30392* (2013.01); *G06Q 10/063* (2013.01)

(58) Field of Classification Search
CPC .............. G07F 17/30297; G07F 17/30106; G07F 17/30864; G07F 17/30988; G07F 17/30029; G07F 17/30112
See application file for complete search history.

(56) References Cited

U.S. PATENT DOCUMENTS

| | | | | |
|---|---|---|---|---|
| 6,275,955 | B1* | 8/2001 | Klein | G05B 19/056 714/2 |
| 2002/0083067 | A1* | 6/2002 | Tamayo | G06F 17/30864 |
| 2003/0149614 | A1* | 8/2003 | Andrus | G06Q 10/10 705/1.1 |
| 2003/0217069 | A1* | 11/2003 | Fagin | G06F 17/30569 |
| 2004/0153776 | A1* | 8/2004 | Rhea | G06F 11/0727 714/25 |
| 2005/0021541 | A1* | 1/2005 | Rangadass | G06Q 10/06 |
| 2005/0192824 | A1* | 9/2005 | Schuetze | G06F 17/30705 706/20 |
| 2006/0167874 | A1* | 7/2006 | von Ahn Arellano | G06F 17/30864 |
| 2006/0168183 | A1* | 7/2006 | Fuller | G05B 19/0426 709/223 |
| 2006/0229899 | A1* | 10/2006 | Hyder | G06Q 10/10 705/1.1 |
| 2008/0126264 | A1* | 5/2008 | Tellefsen | G06Q 10/04 705/80 |
| 2008/0183853 | A1* | 7/2008 | Manion | H04L 12/4641 709/223 |
| 2008/0270356 | A1* | 10/2008 | Anderson | G06F 17/30864 |
| 2008/0281608 | A1* | 11/2008 | Vedula | G06Q 10/063 705/1.1 |
| 2009/0112916 | A1* | 4/2009 | Stuhec | G06F 17/2247 |
| 2010/0114791 | A1* | 5/2010 | Gold | G06Q 10/10 705/347 |
| 2013/0006912 | A1* | 1/2013 | Christie, IV | G06F 19/324 706/47 |
| 2013/0227142 | A1* | 8/2013 | Frumkin | G06F 21/6218 709/226 |

* cited by examiner

*Primary Examiner* — James Trujillo
*Assistant Examiner* — Fatima Mina
(74) *Attorney, Agent, or Firm* — Arent Fox LLP

(57) ABSTRACT

A system, process and method for automatically collecting, collating and transforming data into useful formats and displaying or otherwise outputting the transformed data into useable information. The system provides outputs that are useful in optimizing the enterprise performance of a business. The system, process and method are grounded in an established logical framework for systematically classifying areas of business concerns.

20 Claims, 30 Drawing Sheets

System Functional Overview

Diagnostic Repository

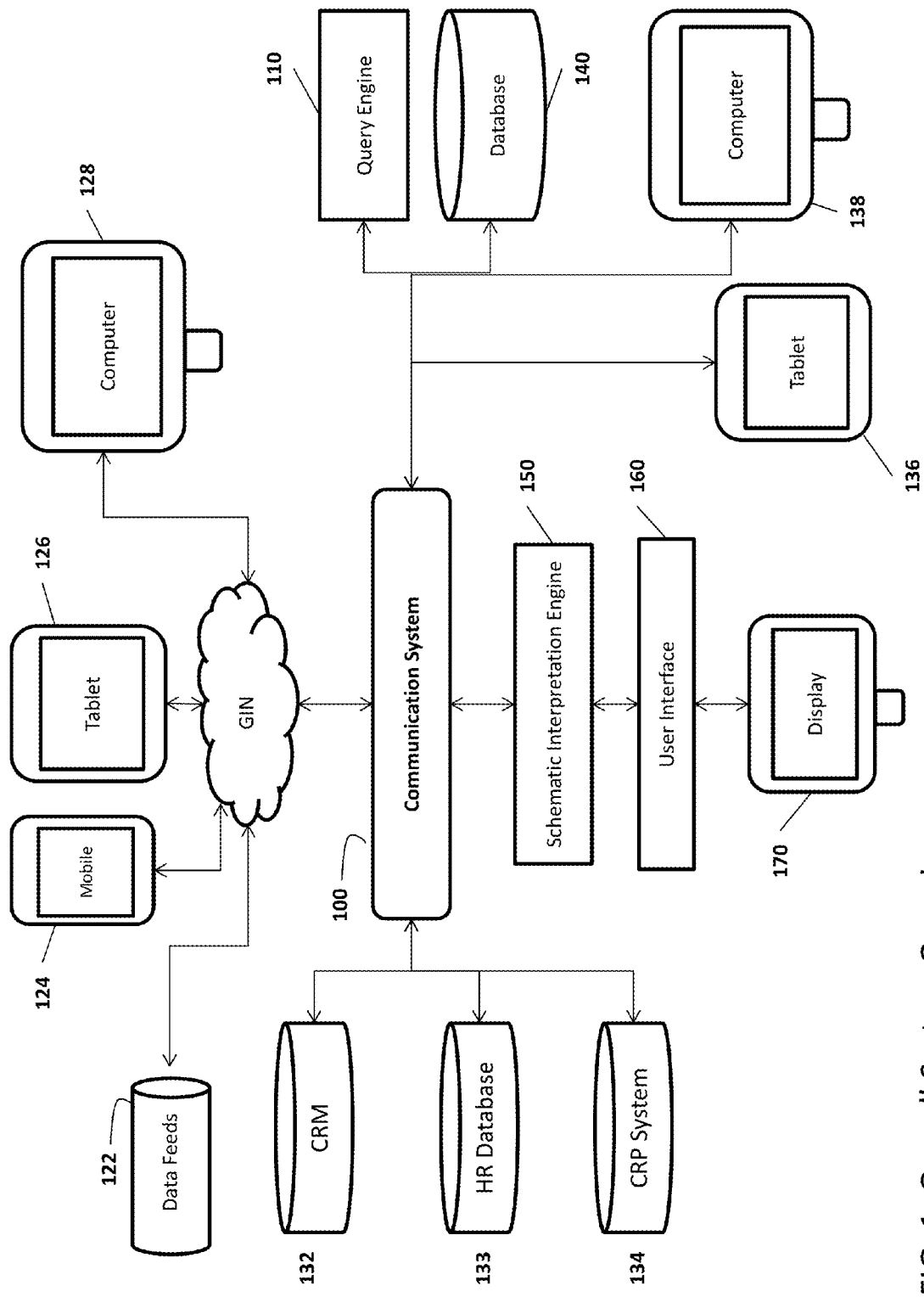
FIG. 1: Overall System Overview

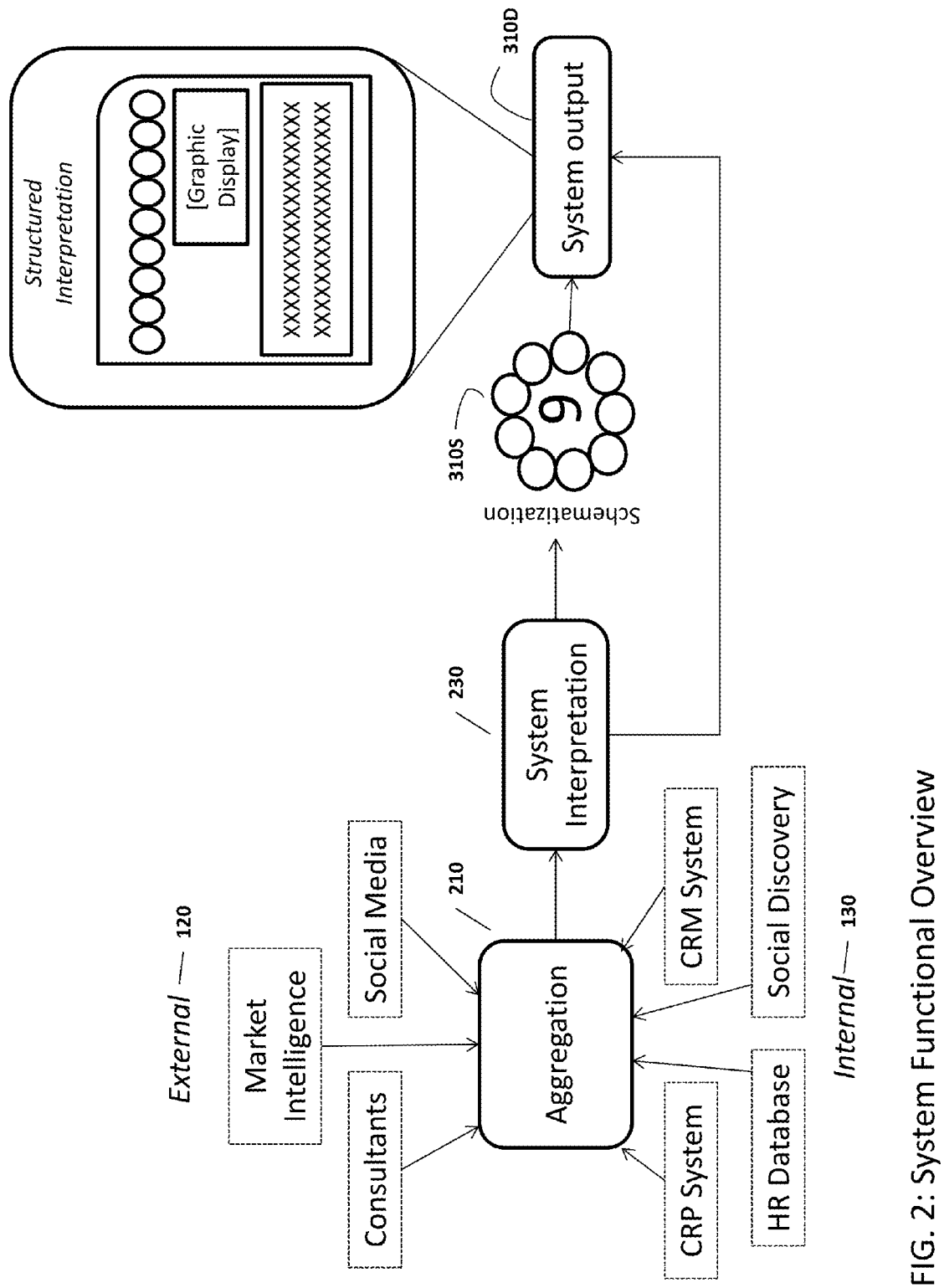
FIG. 2: System Functional Overview

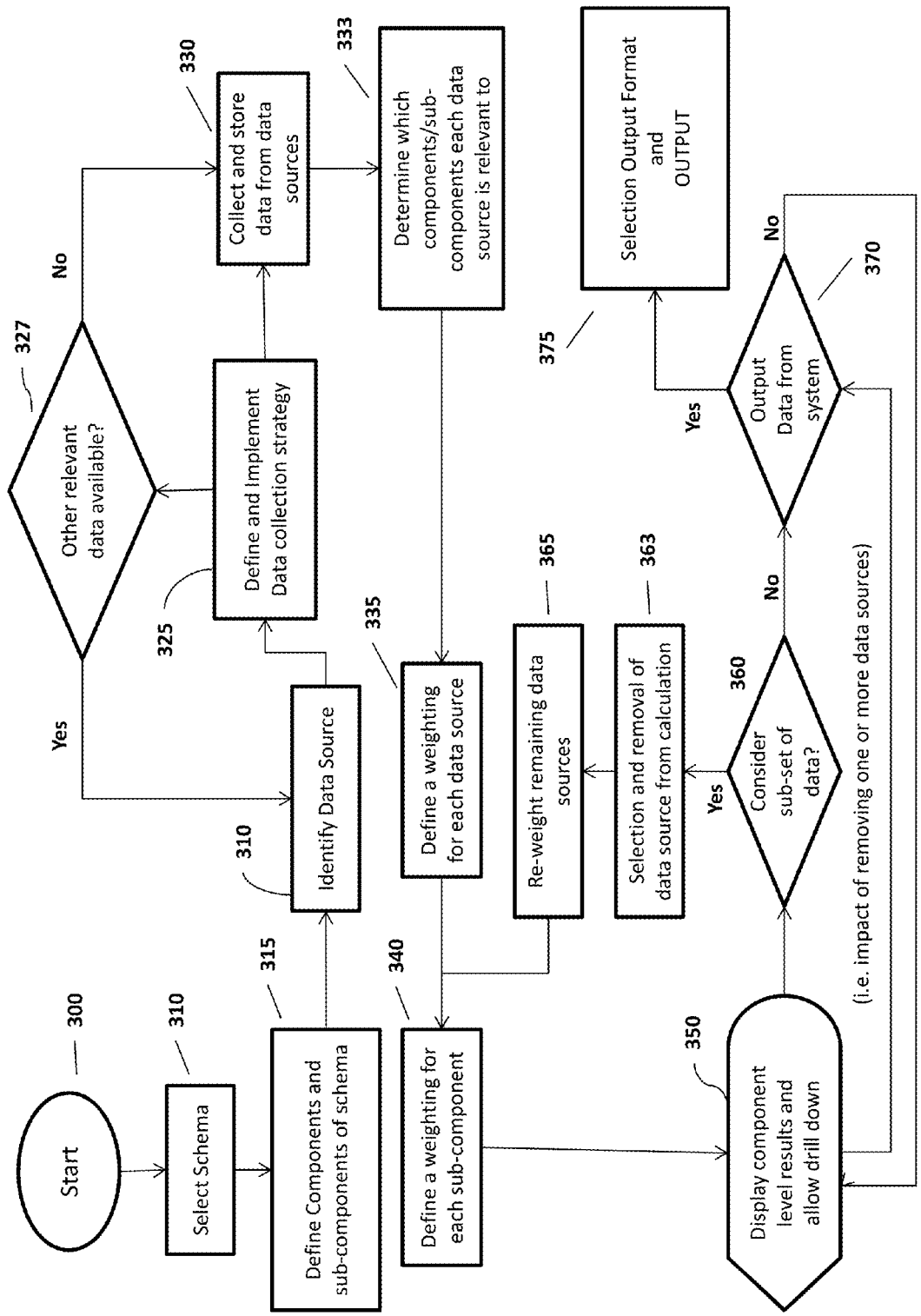
FIG. 3: Transformation Process Flow

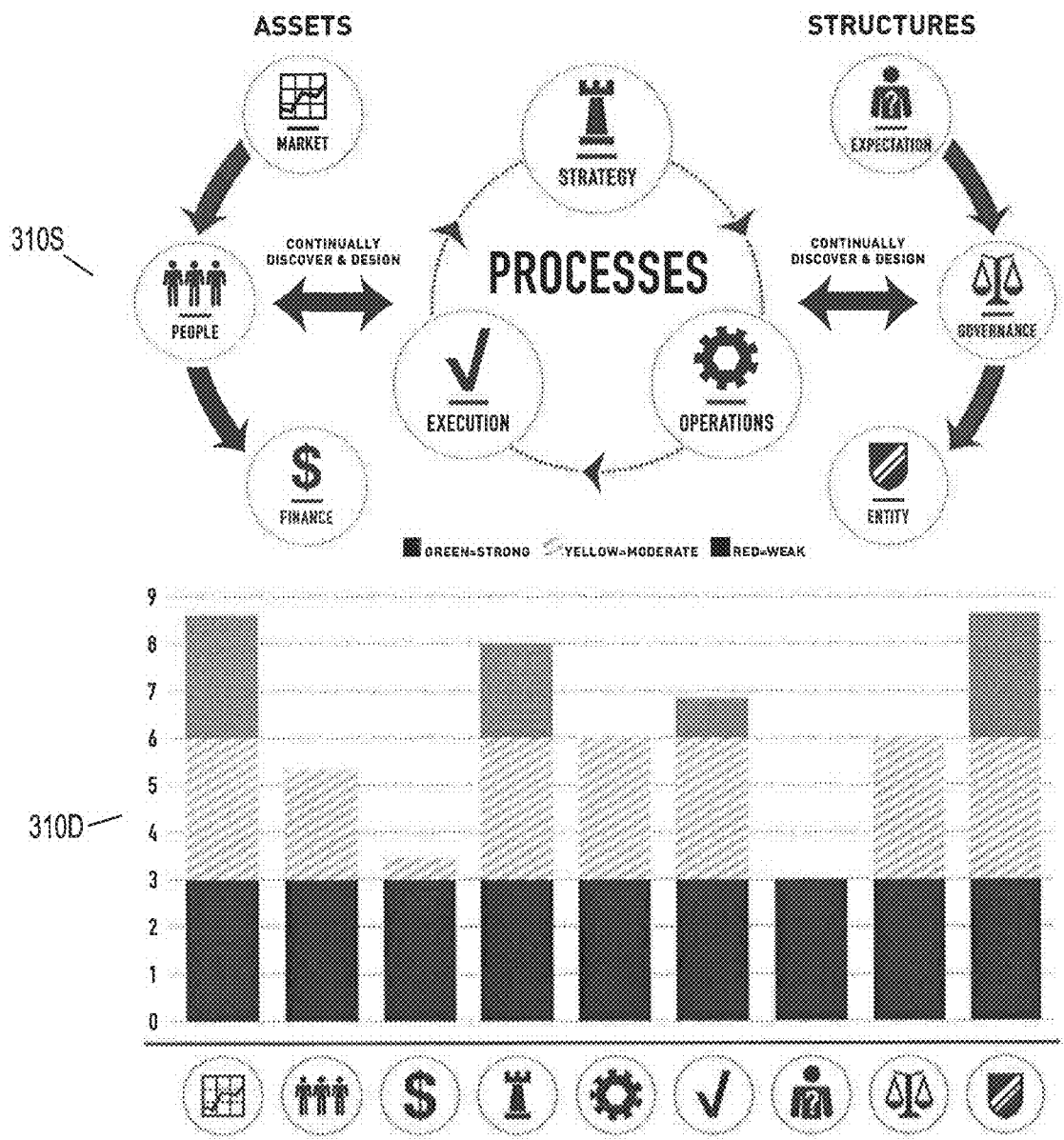
FIG. 3A: Schema/Dashboard Output

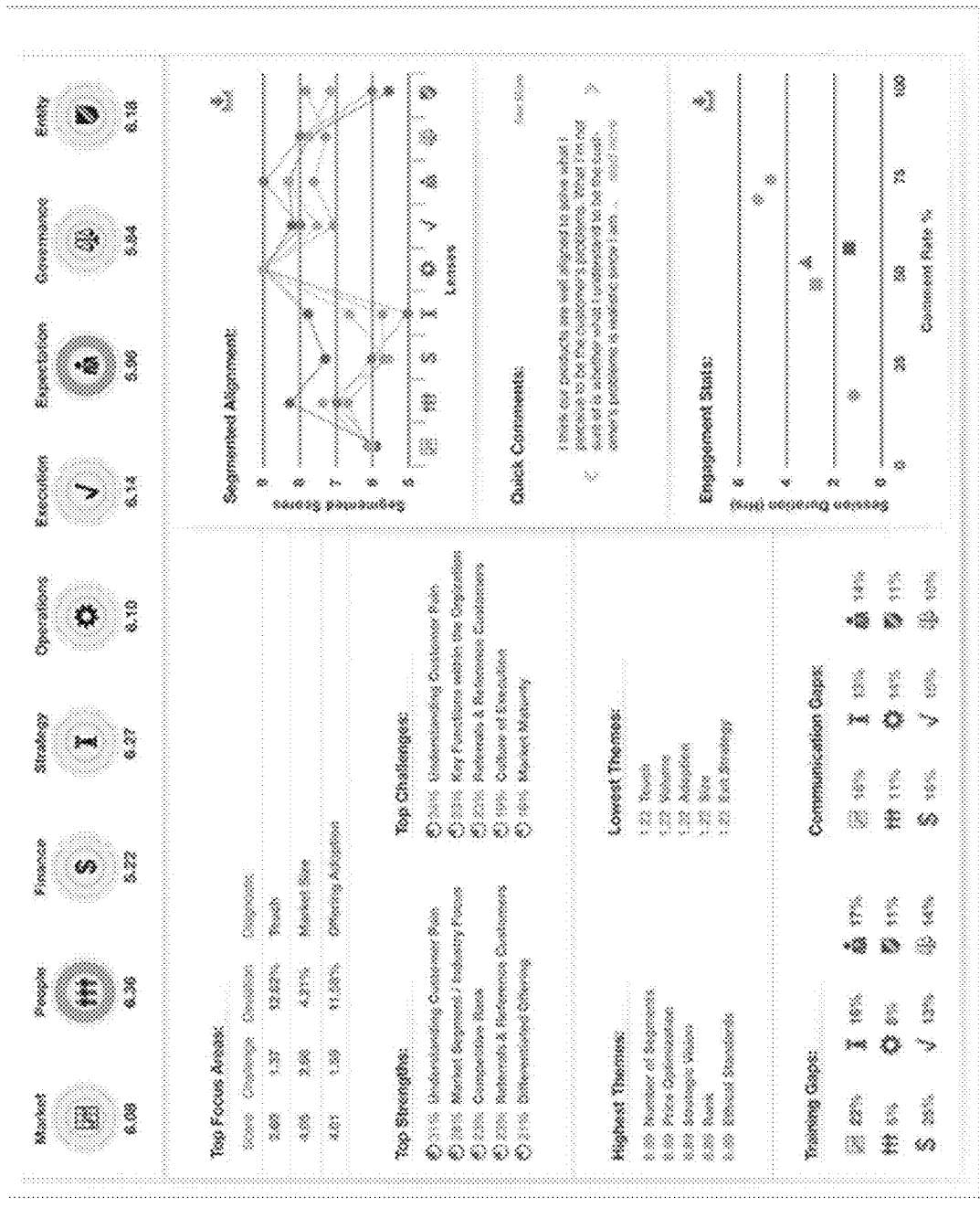
FIG. 3B: Alternative Output

| ASSETS | PROCESSES | STRUCTURES |
|---|---|---|
| MARKET — Understanding the market, opportunity, characteristics, size, timing, investment, target, customer behavior, positioning, competition and differentiation. | STRATEGY — Envisioning and designing the company go to market plan, aids in determining any breakout moves for the organization. | EXPECTATION — The setting, managing, and communication of expectations throughout the organization and with company stakeholders. |
| PEOPLE — Assessing the people, their motivation, strengths, capabilities; and the culture, who the leaders are, level of transparency and collaboration, what politics and dysfunctions exist. | OPERATIONS — The processes, systems and infrastructure used by the organization; the bridge between strategy and execution. | GOVERNANCE — Ensuring the ethical and compliant operation of the organization. |
| FINANCE — Viability of the financial model, assets, liabilities, comparable performance, capital requirements, financial statements and constraints. | EXECUTION — The action or doing, and measurement of the strategy and operations. | ENTITY — The type of organization, protection of intellectual property and understanding of legal liabilities. |

FIG. 3C: Lens Description

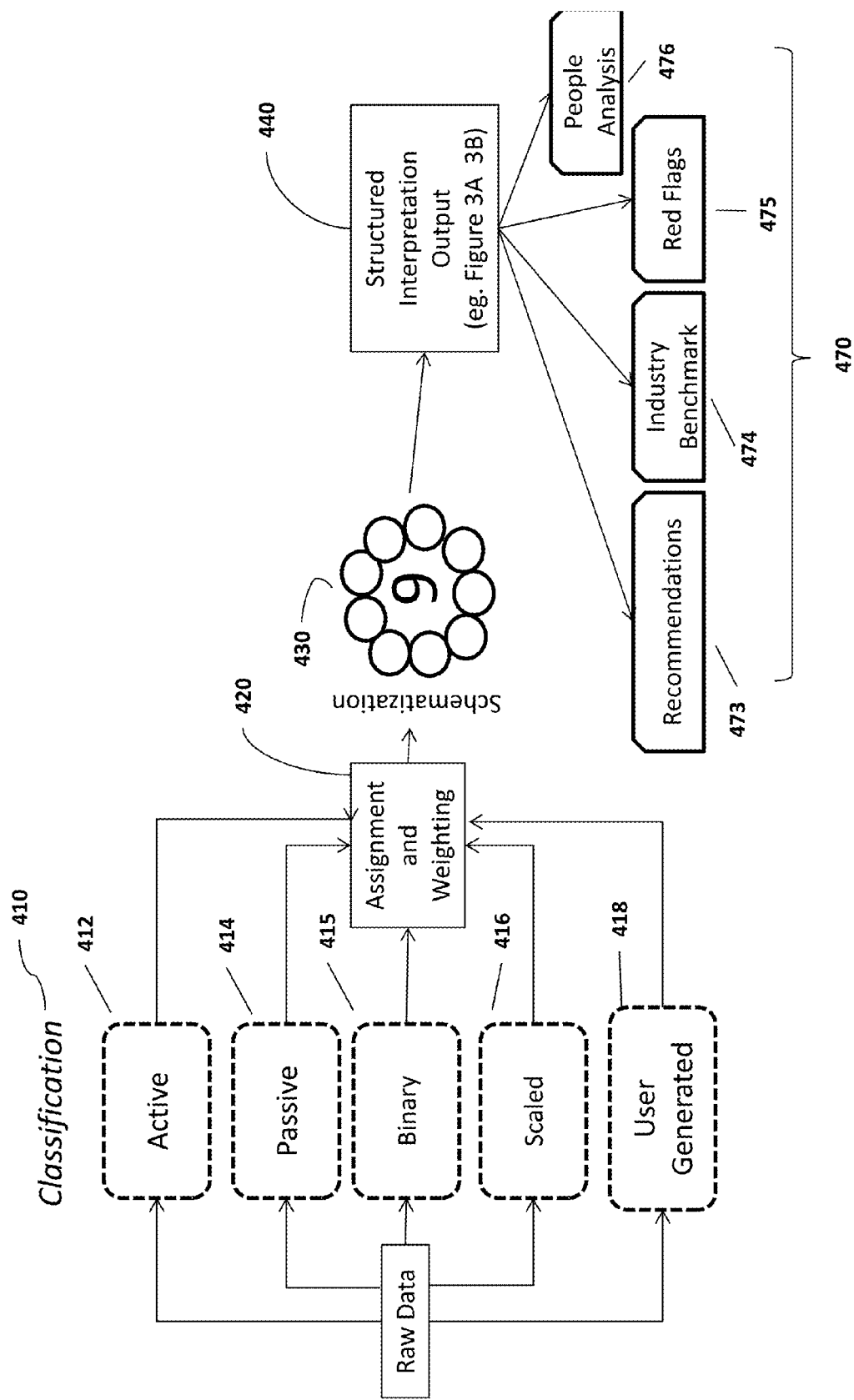
FIG. 4A: Raw Data (Gray Matter) → Schema

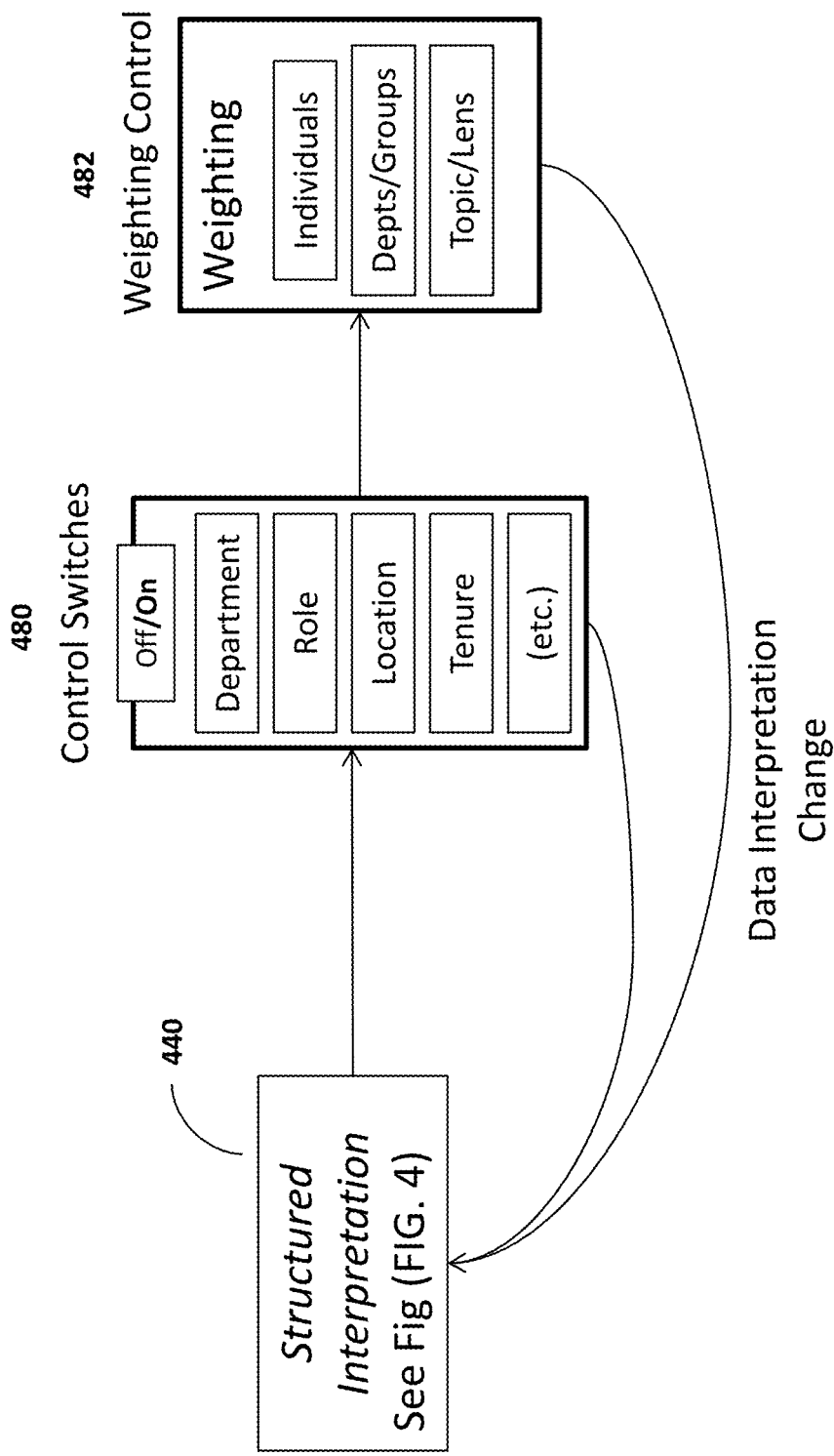
FIG. 4B: Ability to Control Raw Data Calculations

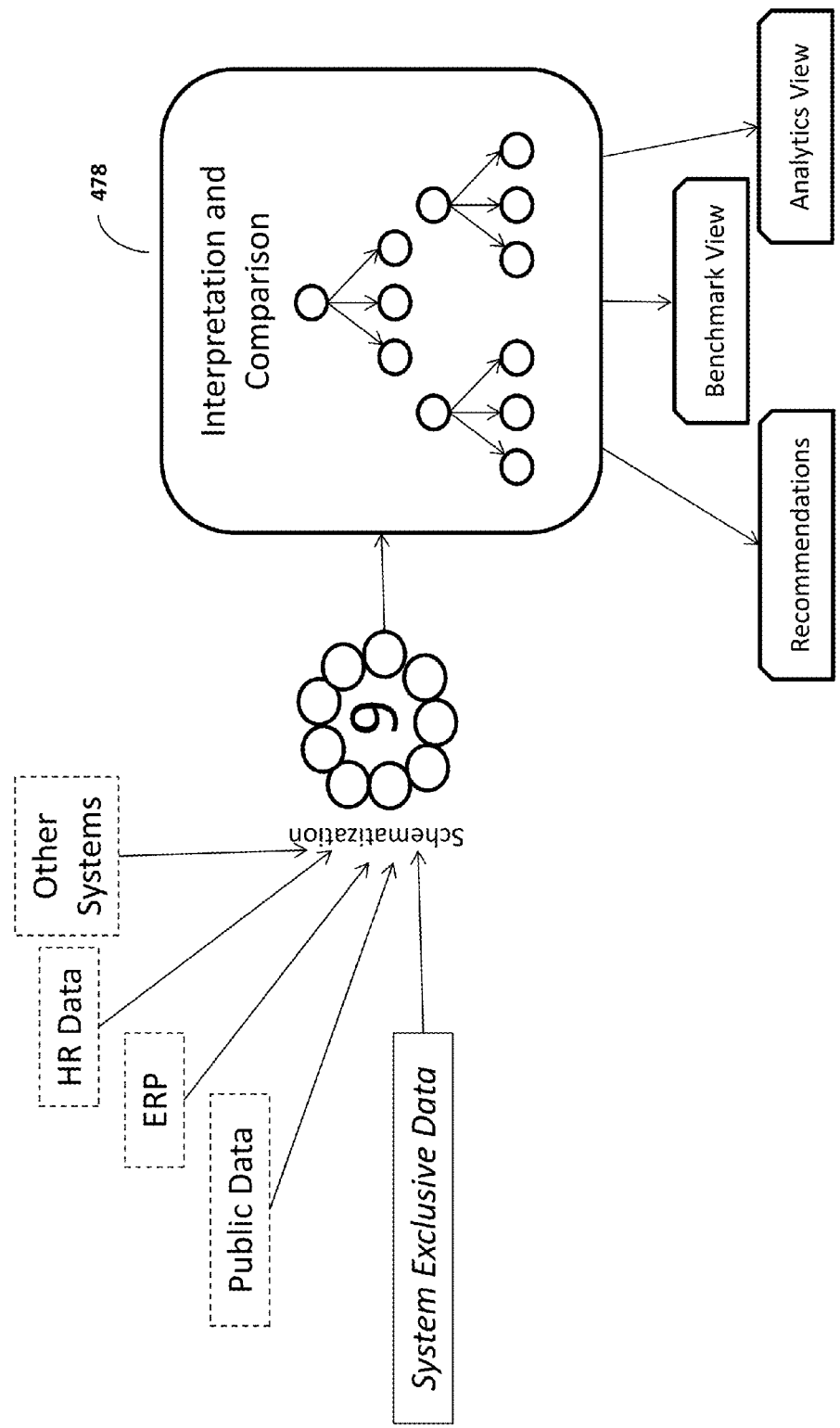
FIG. 4C: Holistic Business Diagnostic

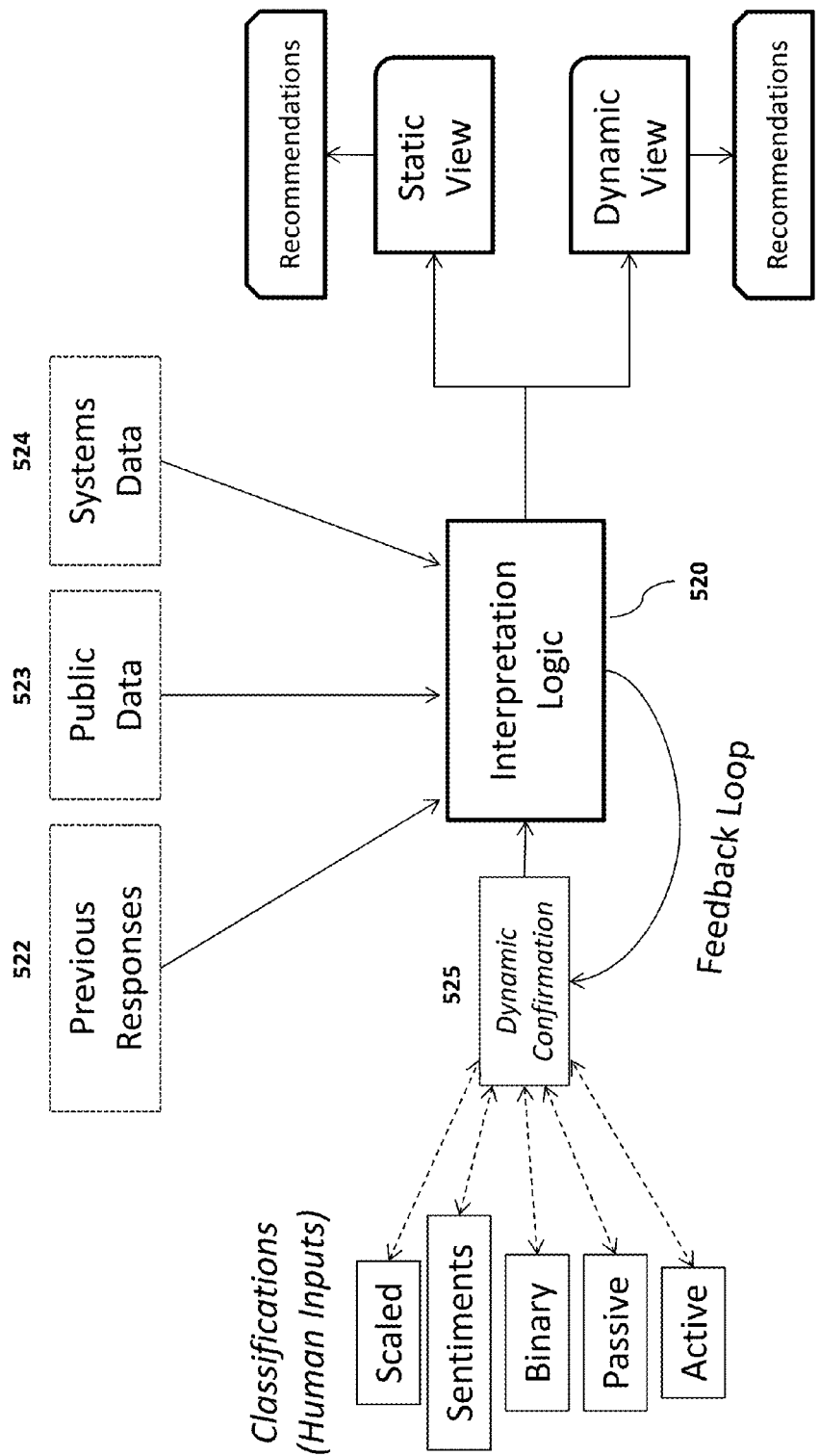
FIG. 5: Responsive Diagnosis

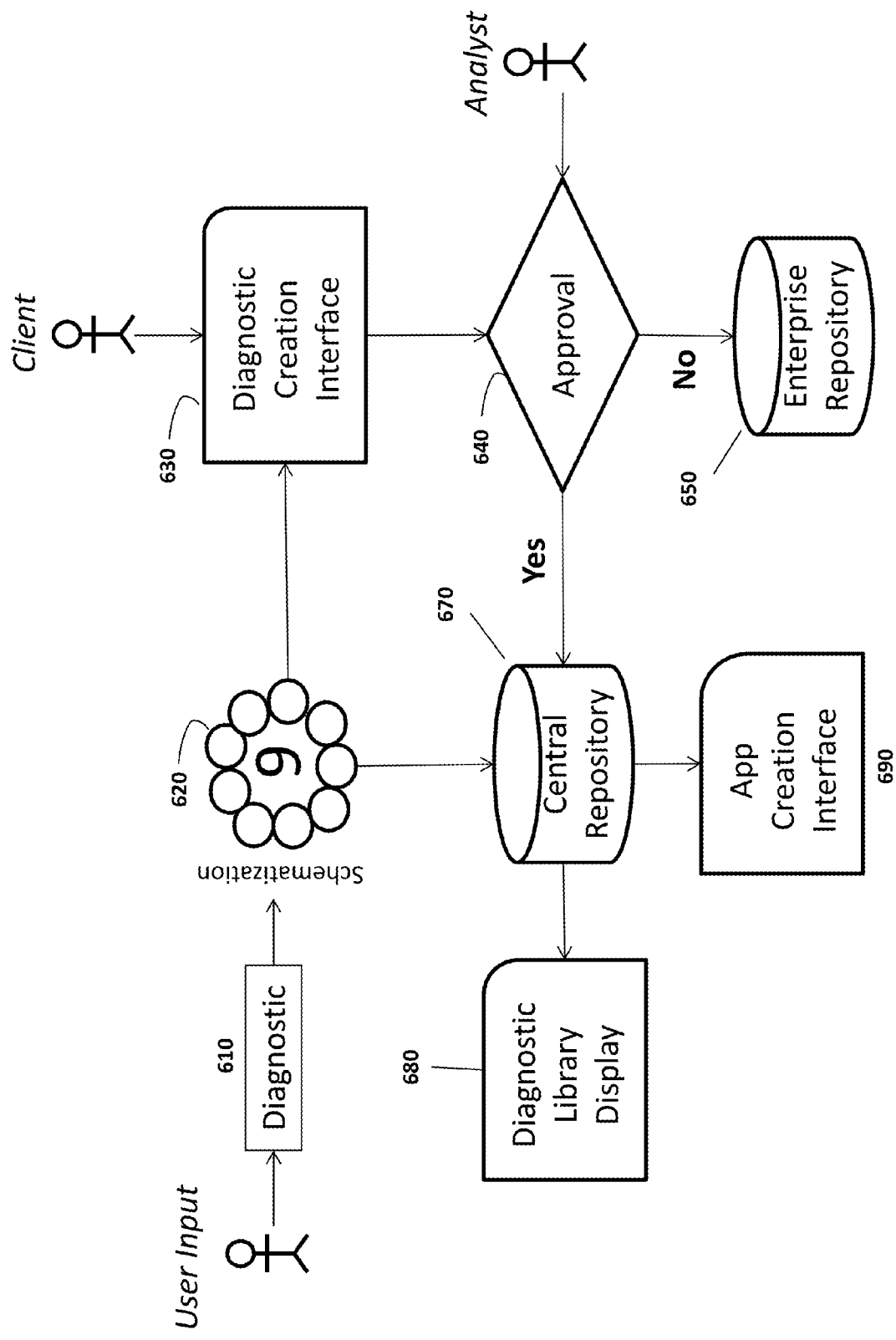
FIG. 6: Diagnostic Repository

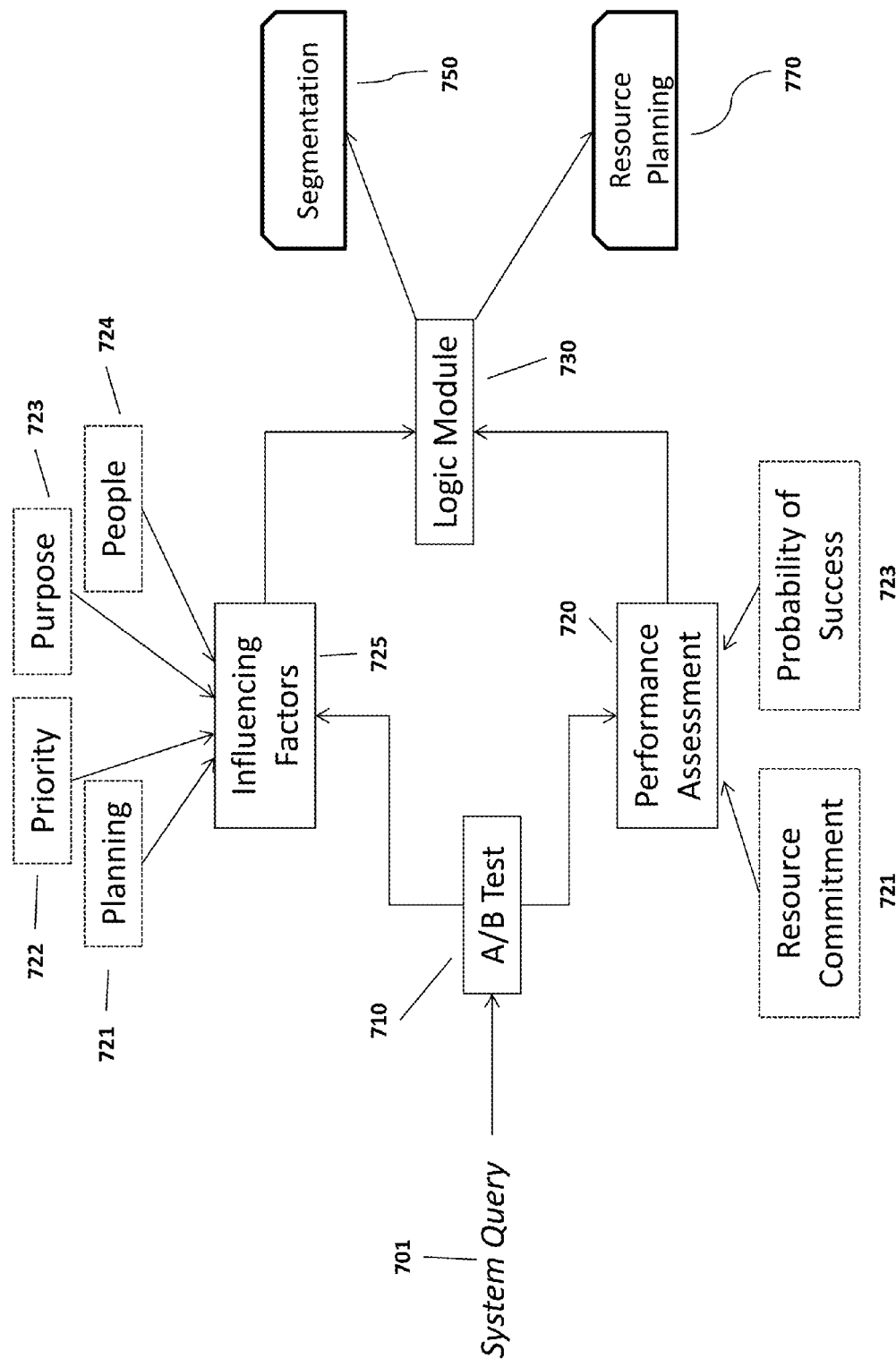
FIG. 7: Segmentation and Selection

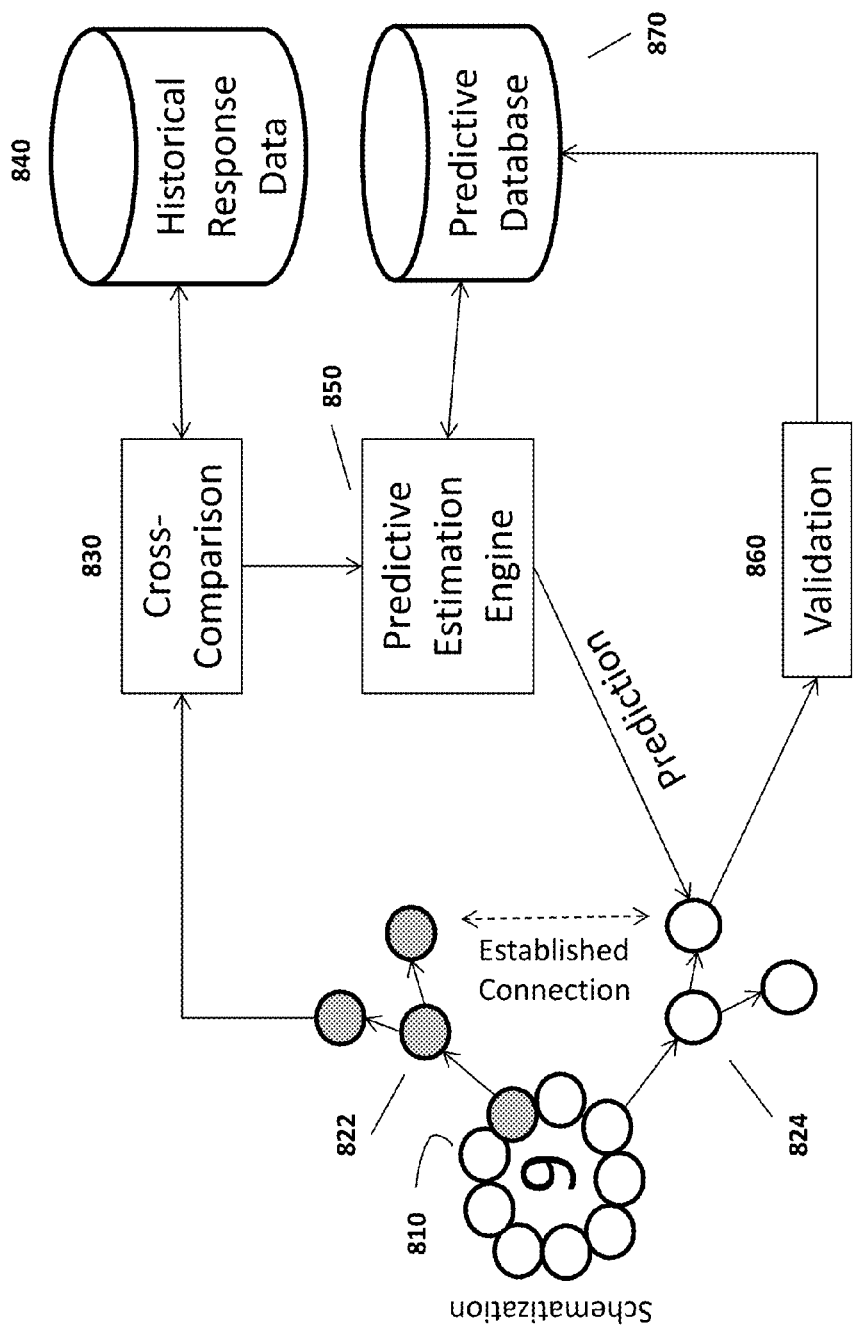
FIG. 8: Predictive Analysis

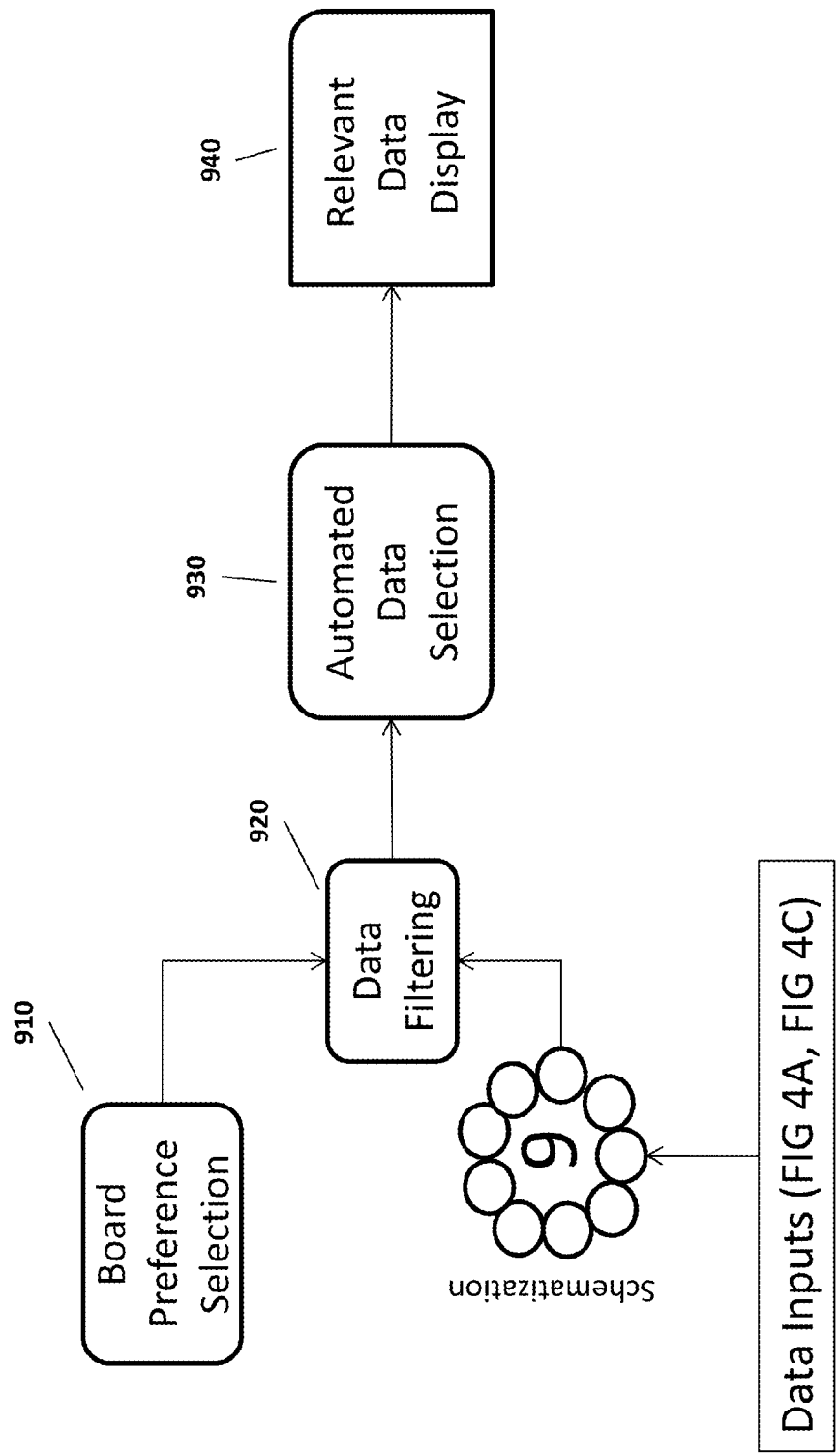
FIG. 9: Board Reporting Conversions

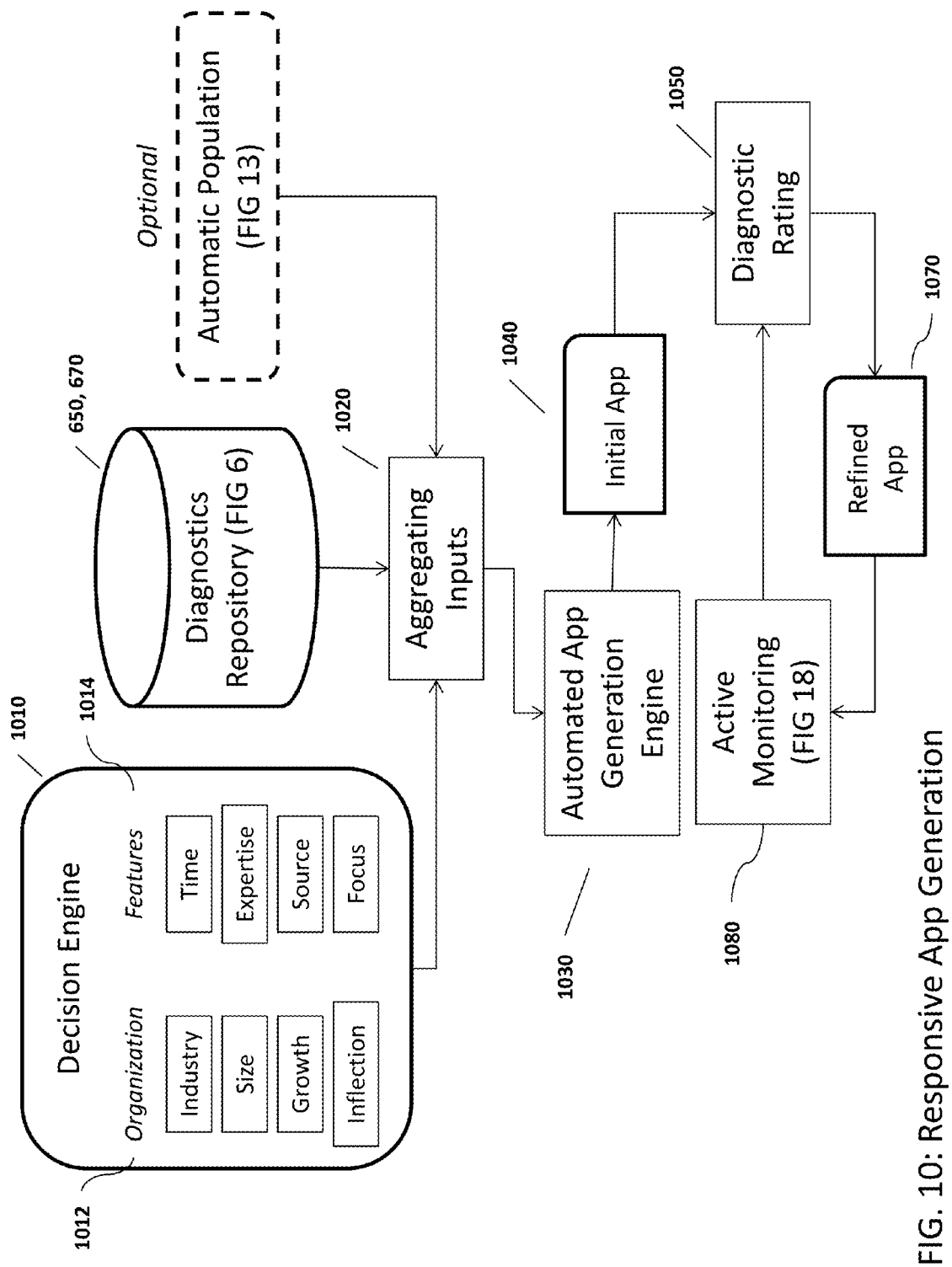
FIG. 10: Responsive App Generation

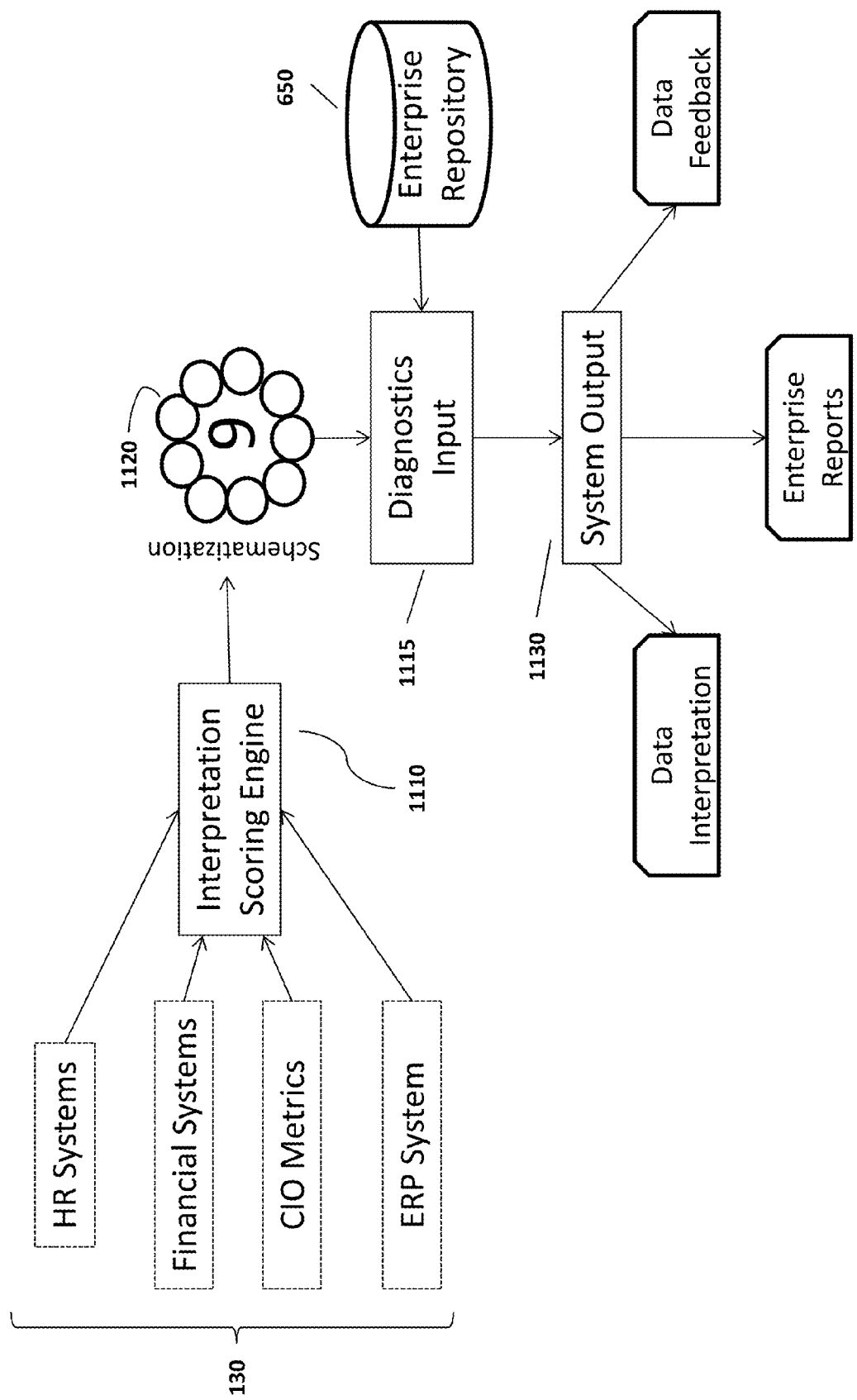
FIG. 11: Systems Data Interpretation

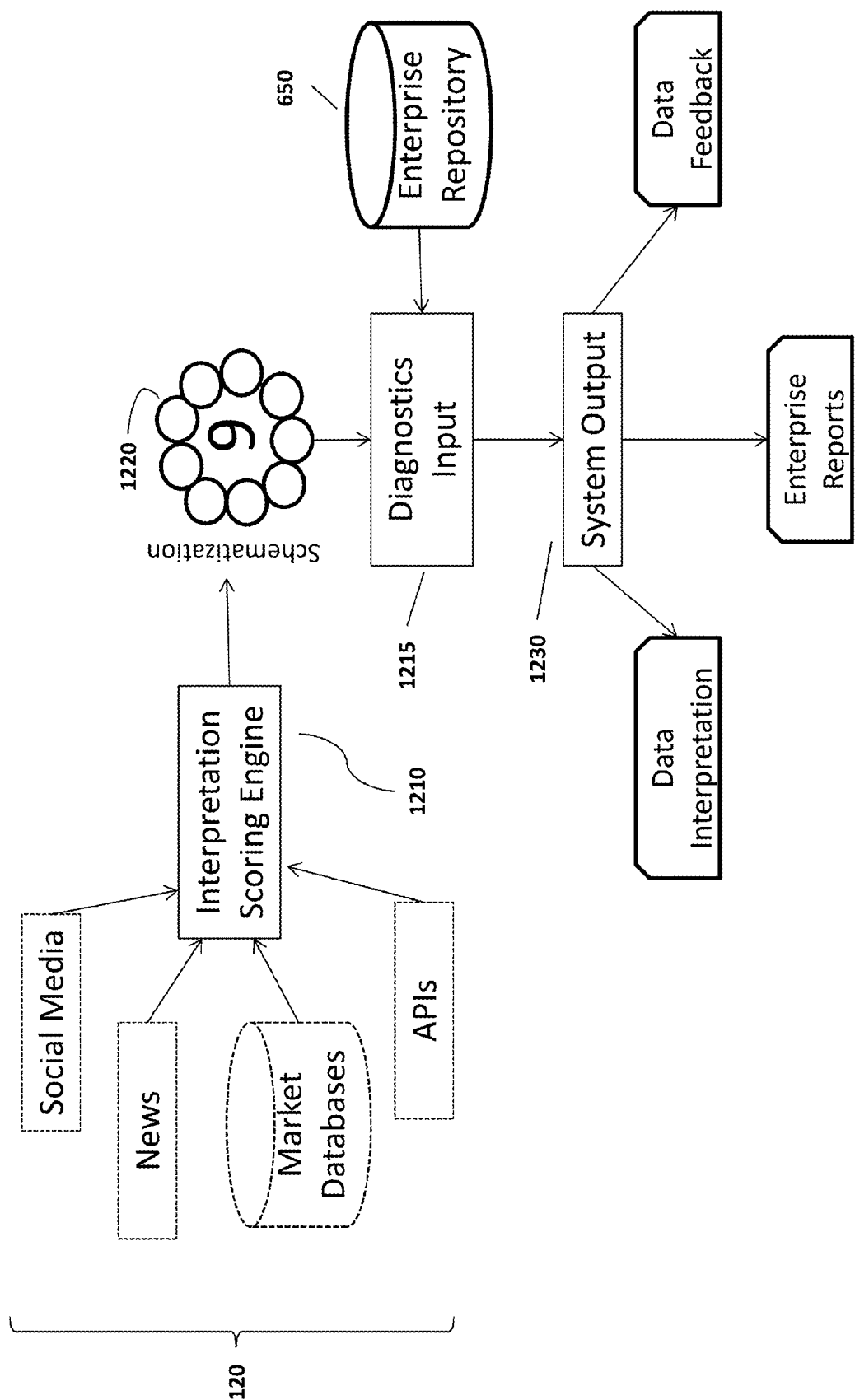
FIG. 12: Public Data Schematization

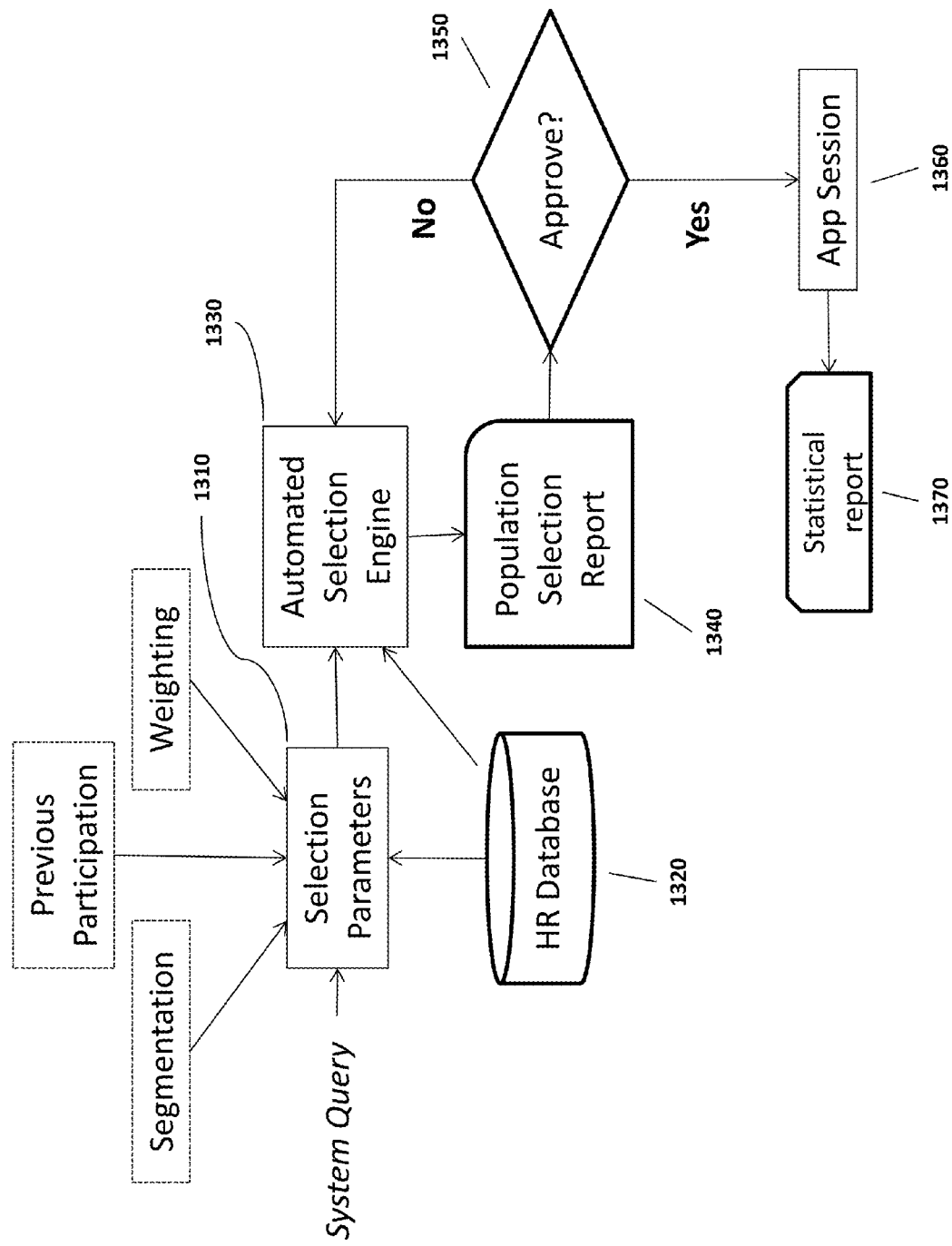
FIG. 13: Automatic Population

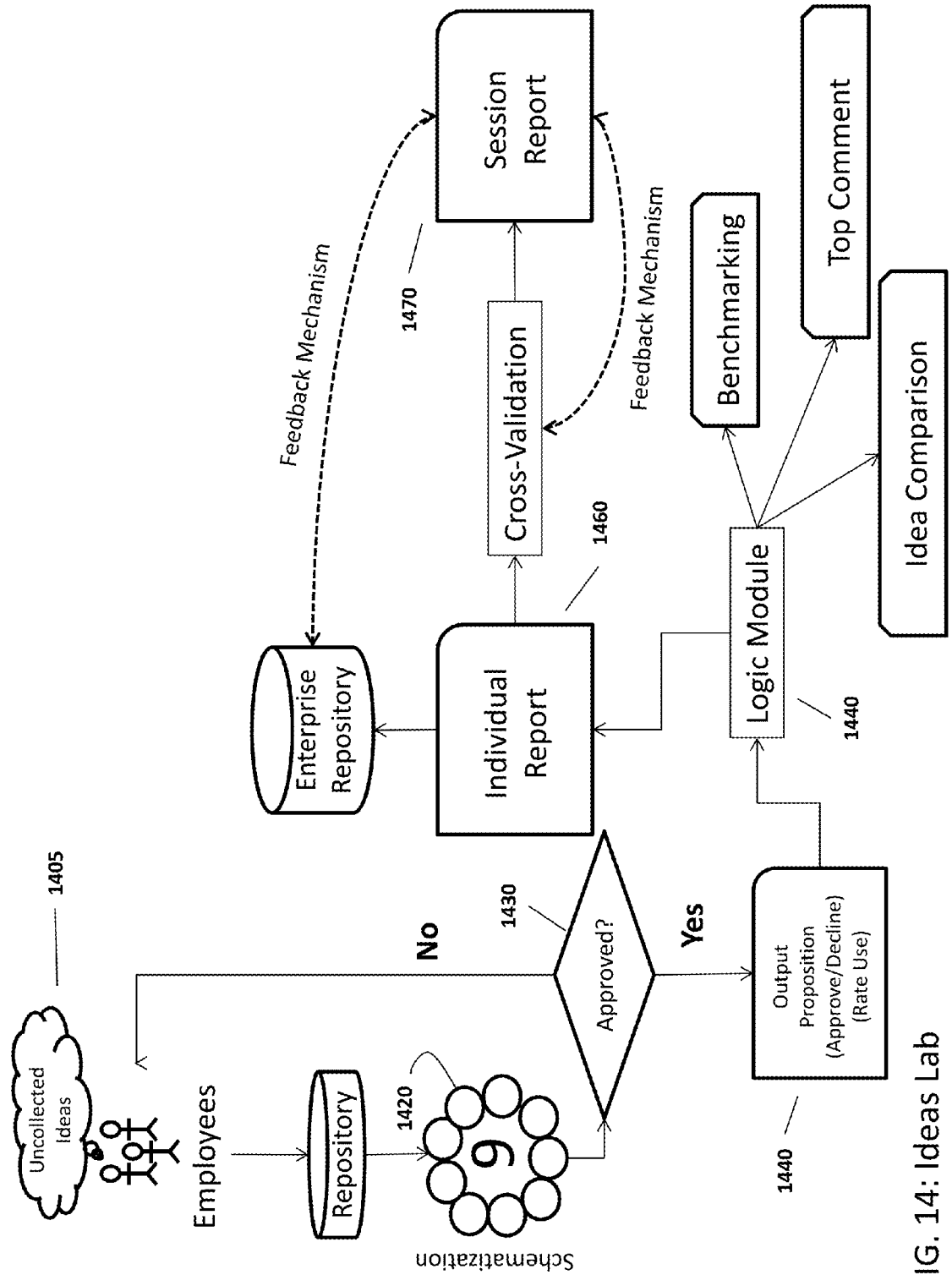
FIG. 14: Ideas Lab

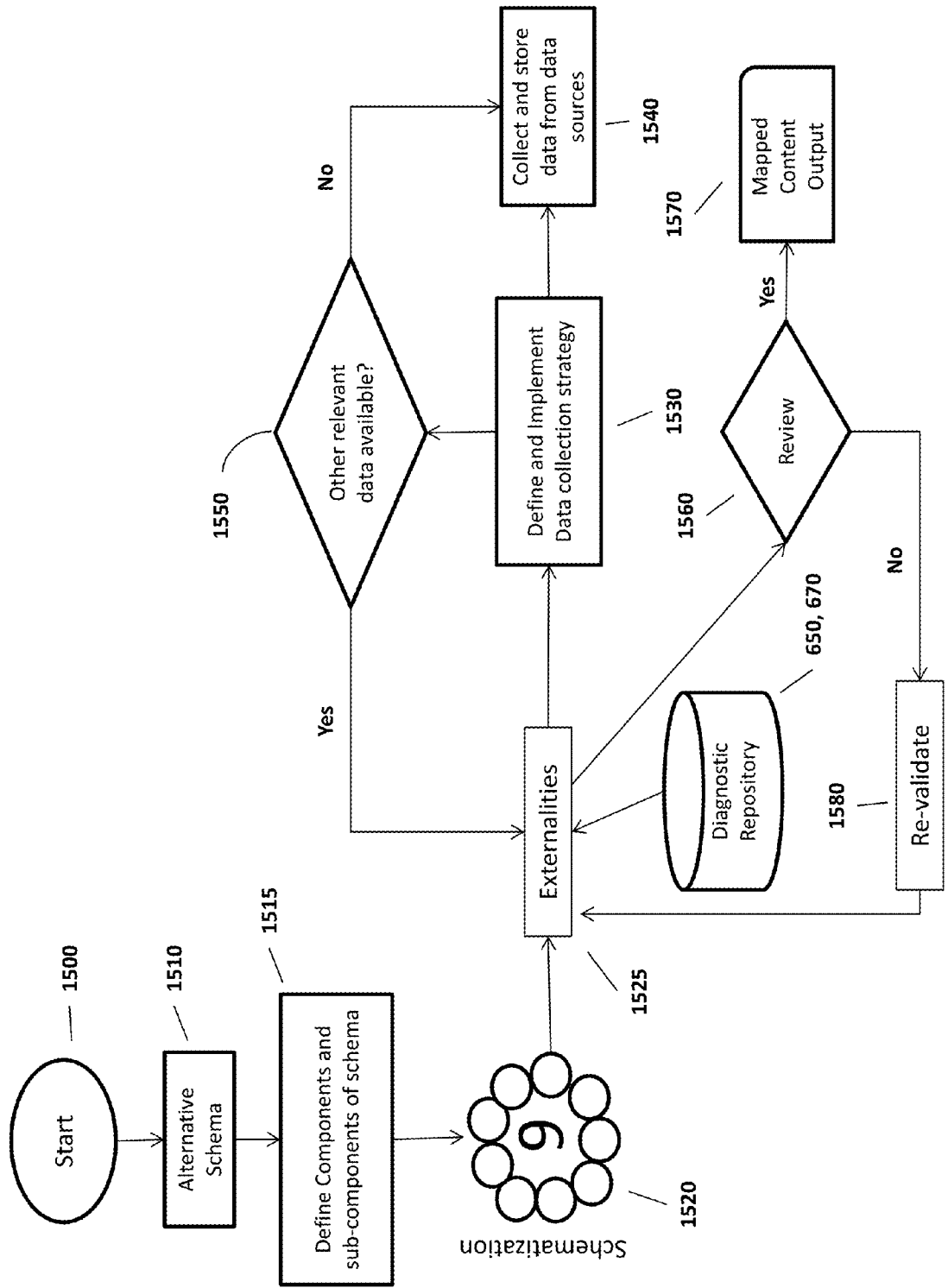
FIG. 15A: Automated Matching

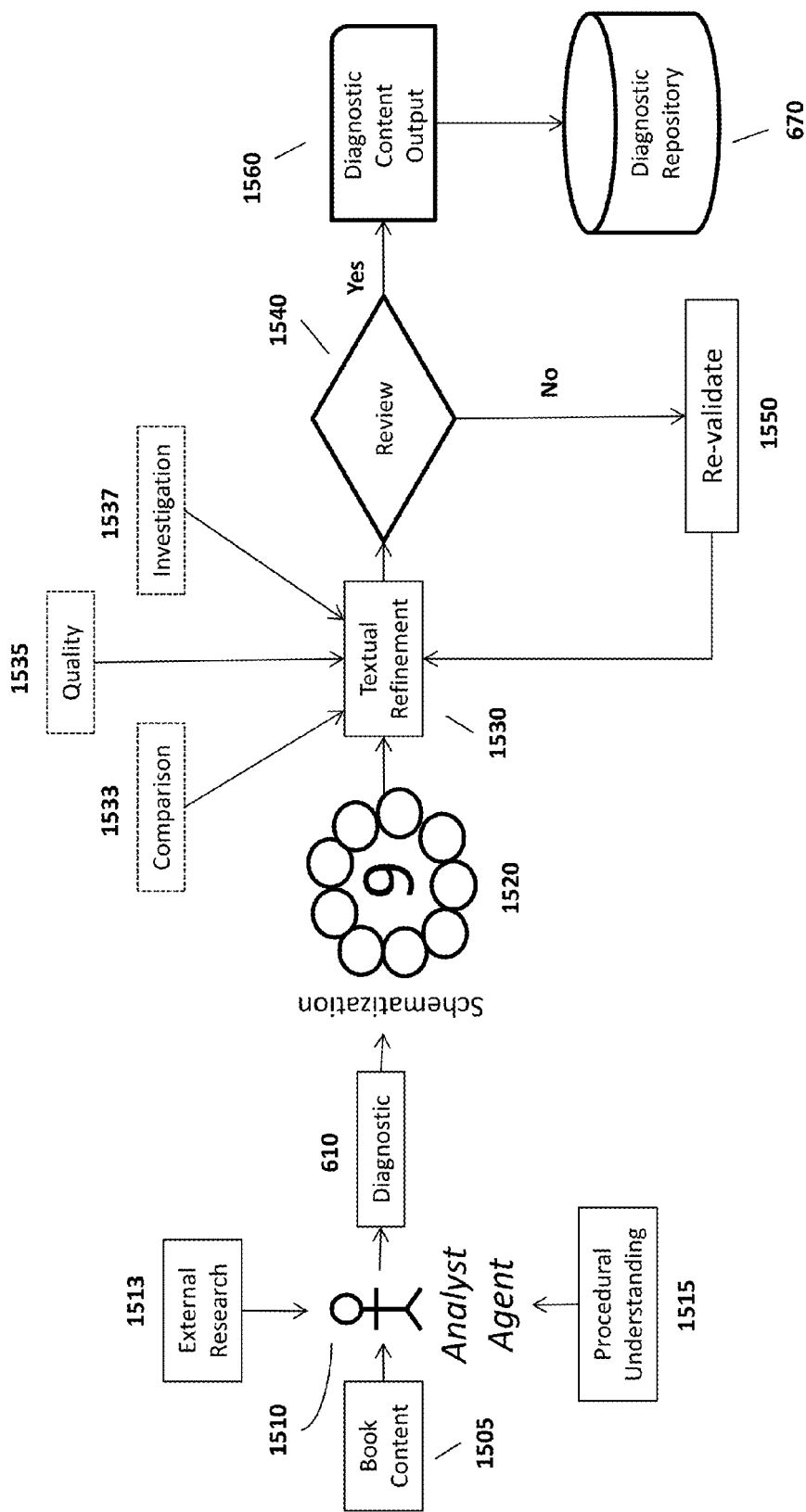
FIG. 15B: Book Content to Schema

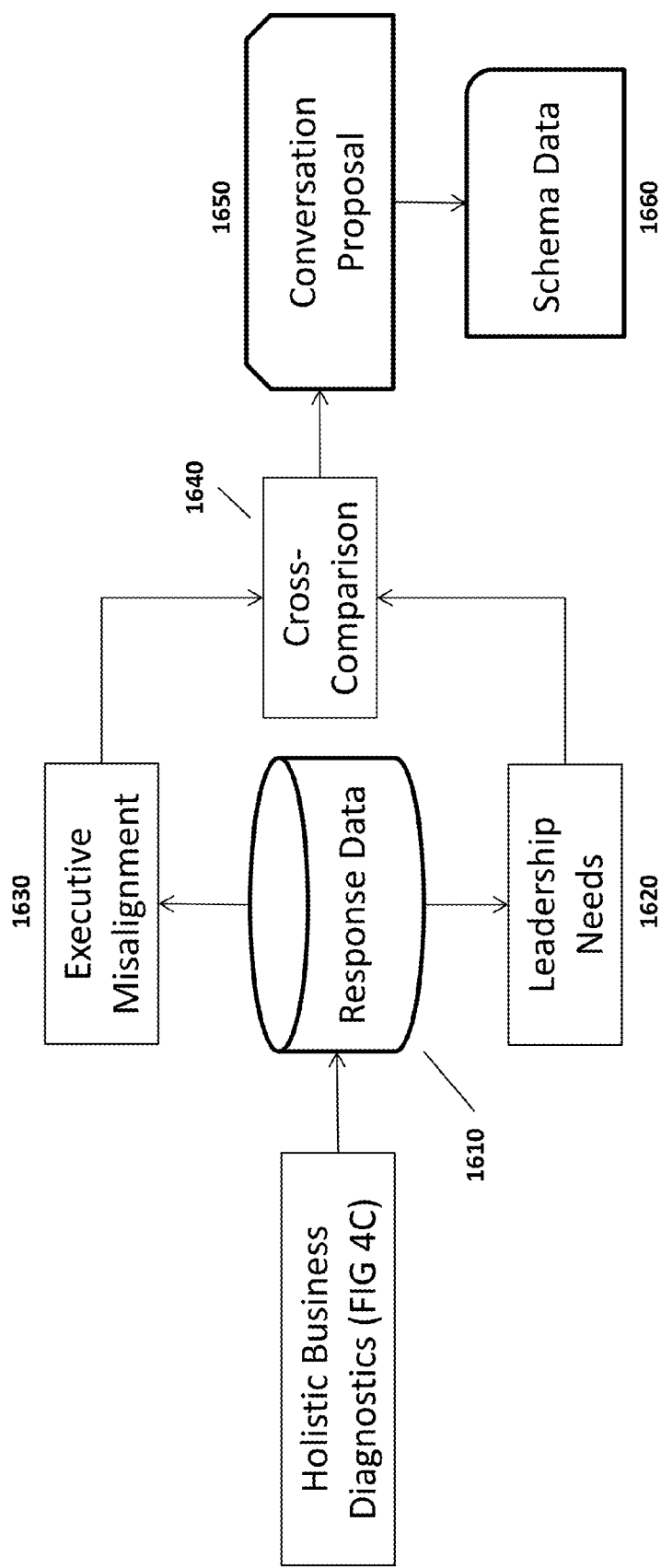
FIG. 16: Suggest a Conversation

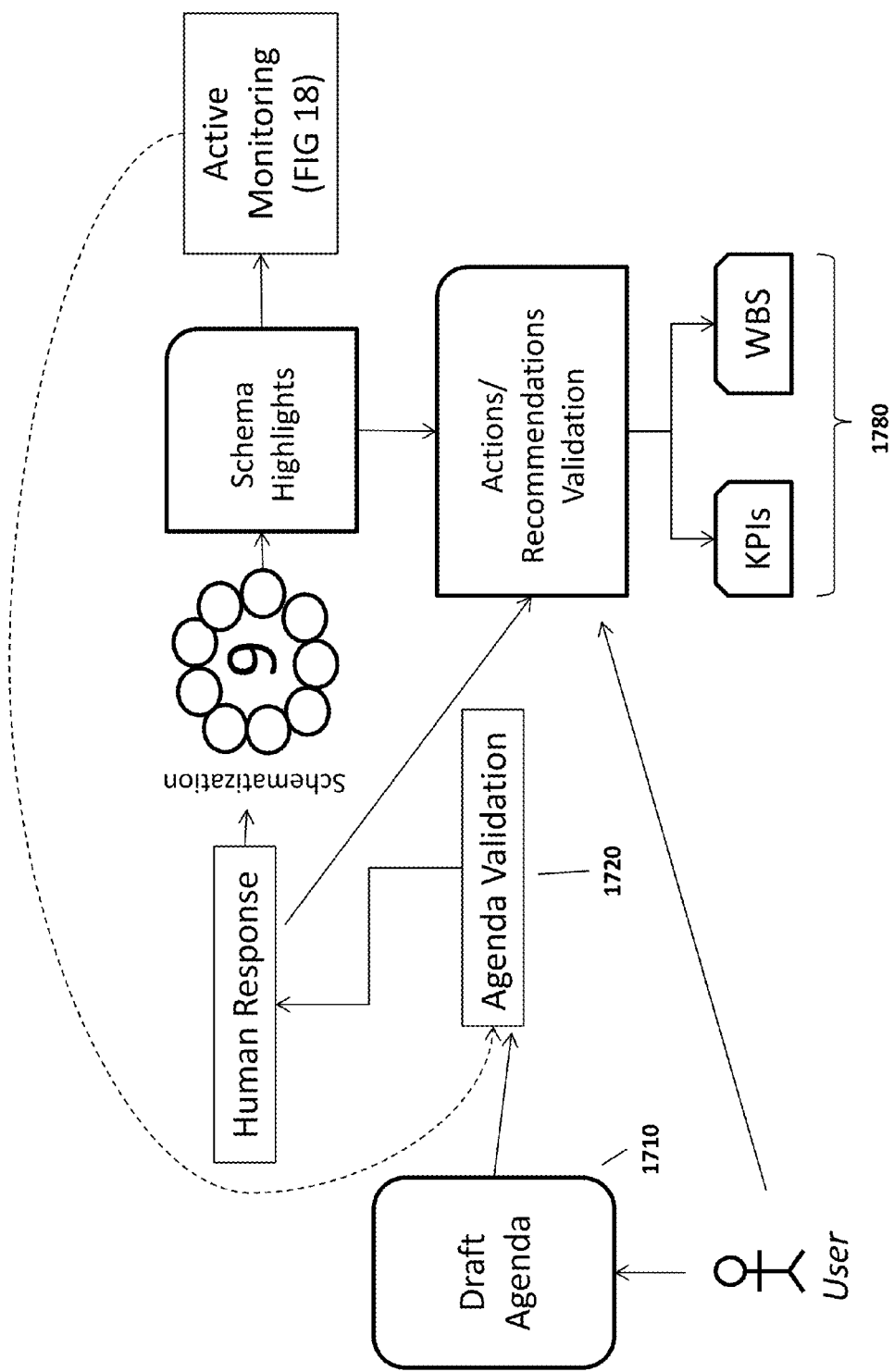
FIG. 17: Automatic Meeting

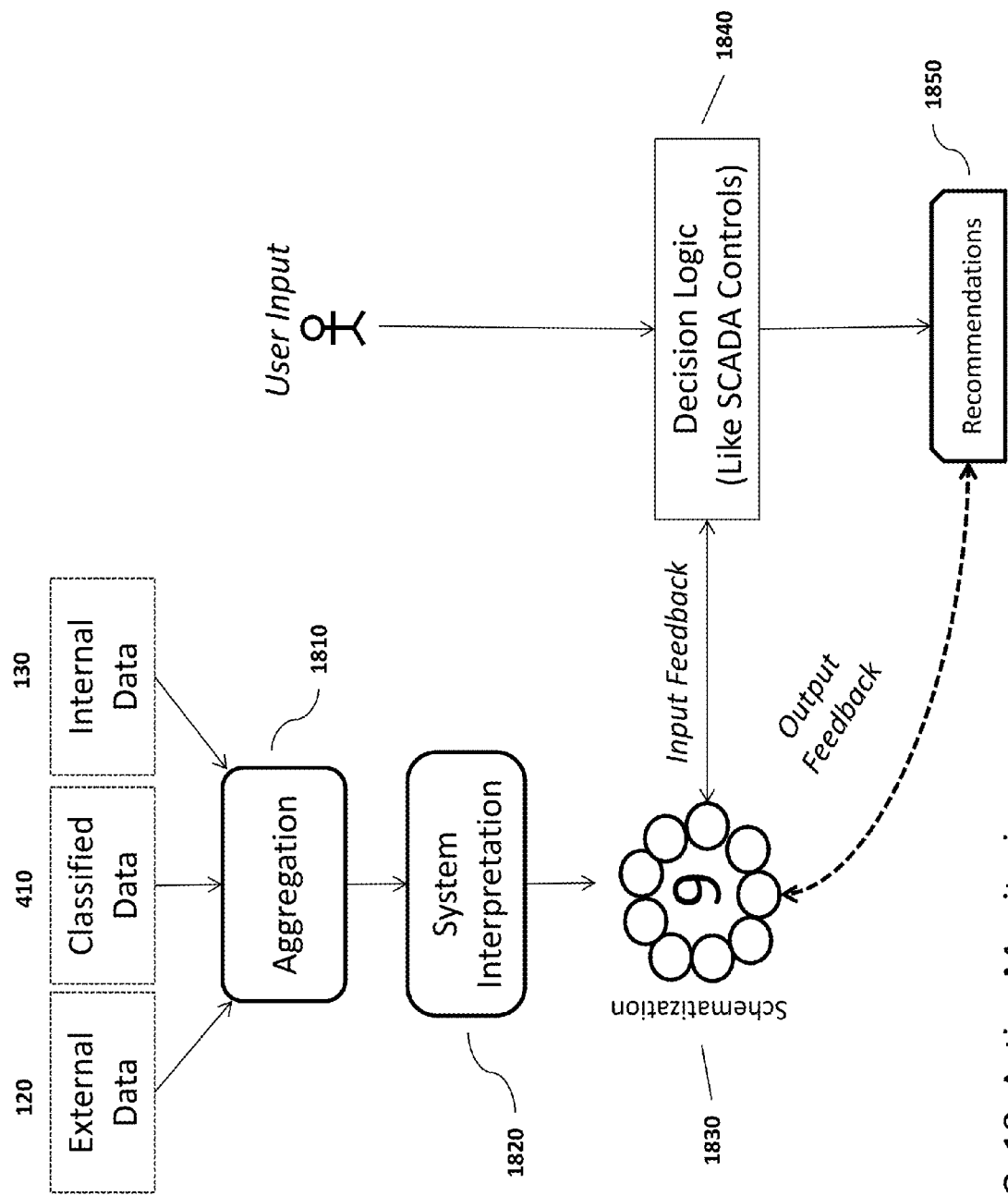
FIG. 18: Active Monitoring

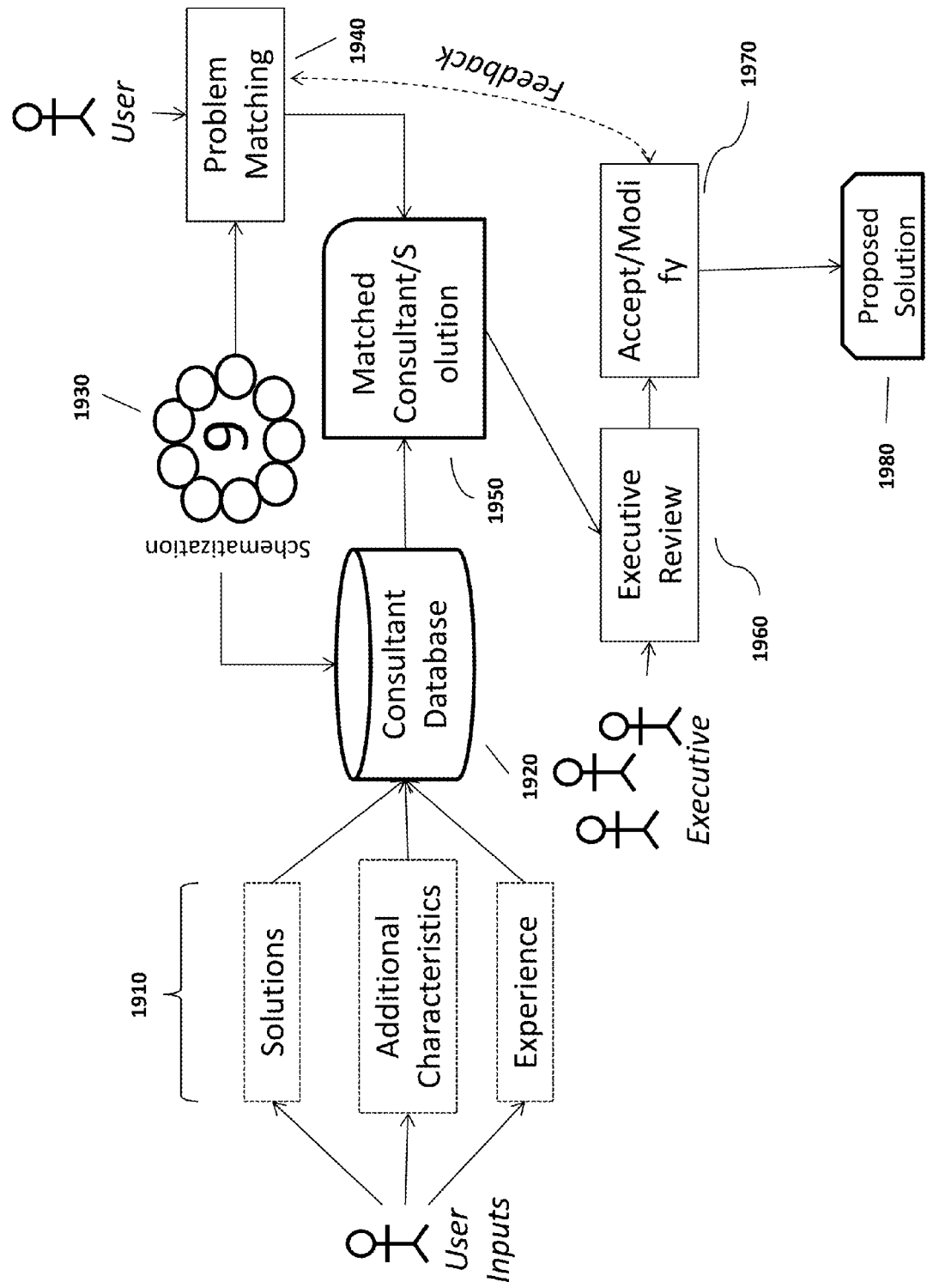
FIG. 19: Consultant Profiling

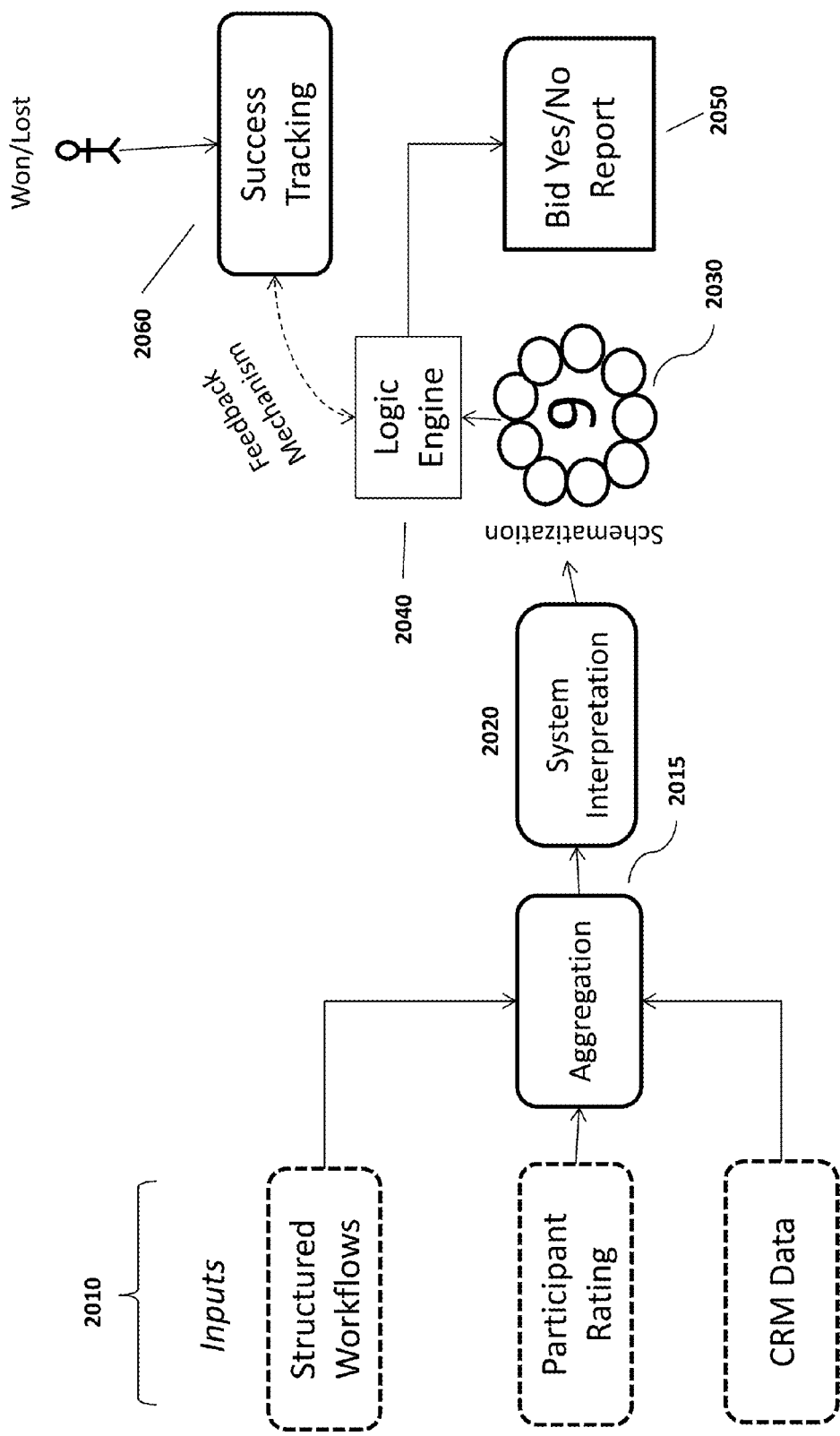
FIG. 20: Bid App

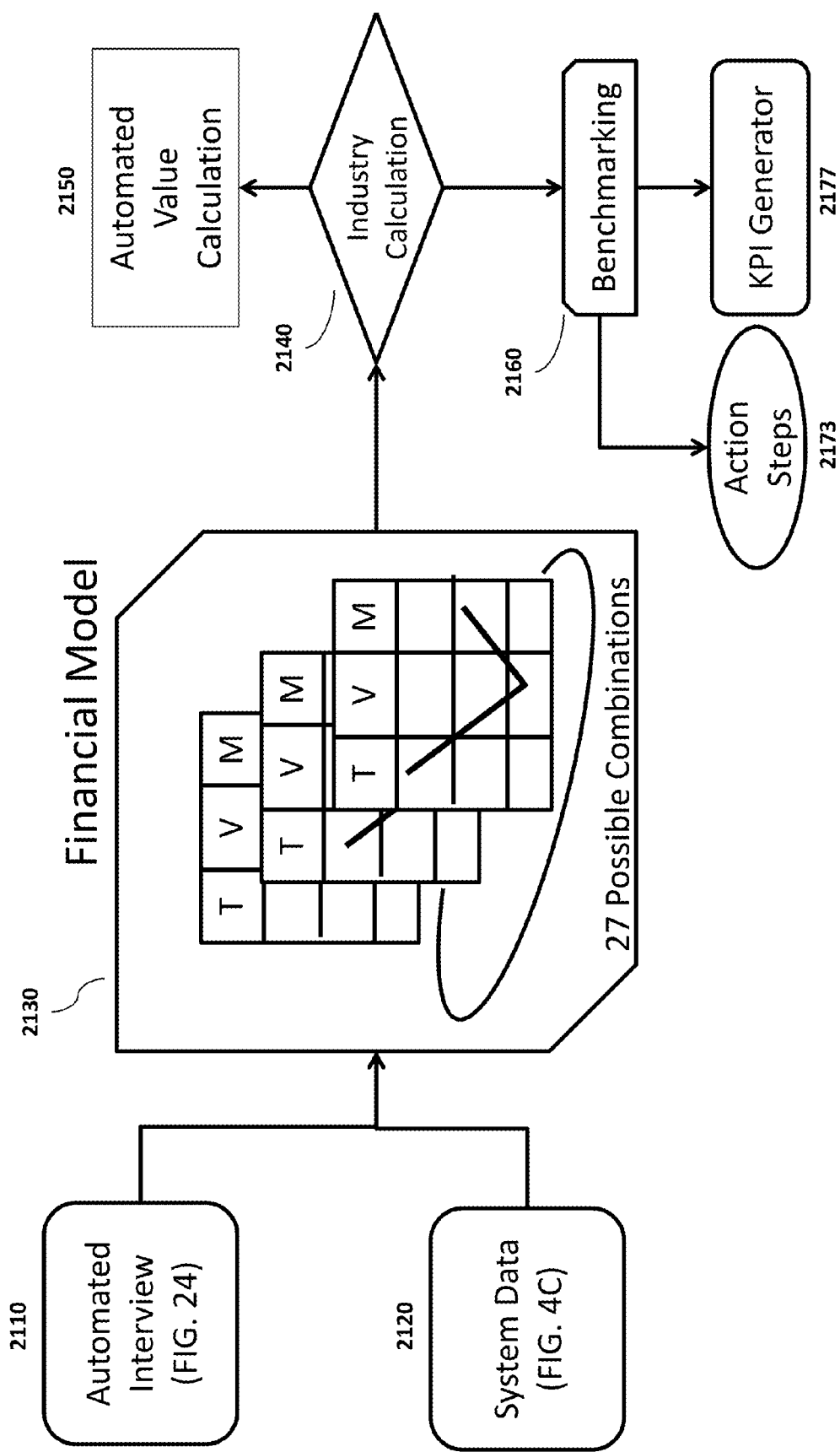
FIG. 21: Shapshot9 Interface

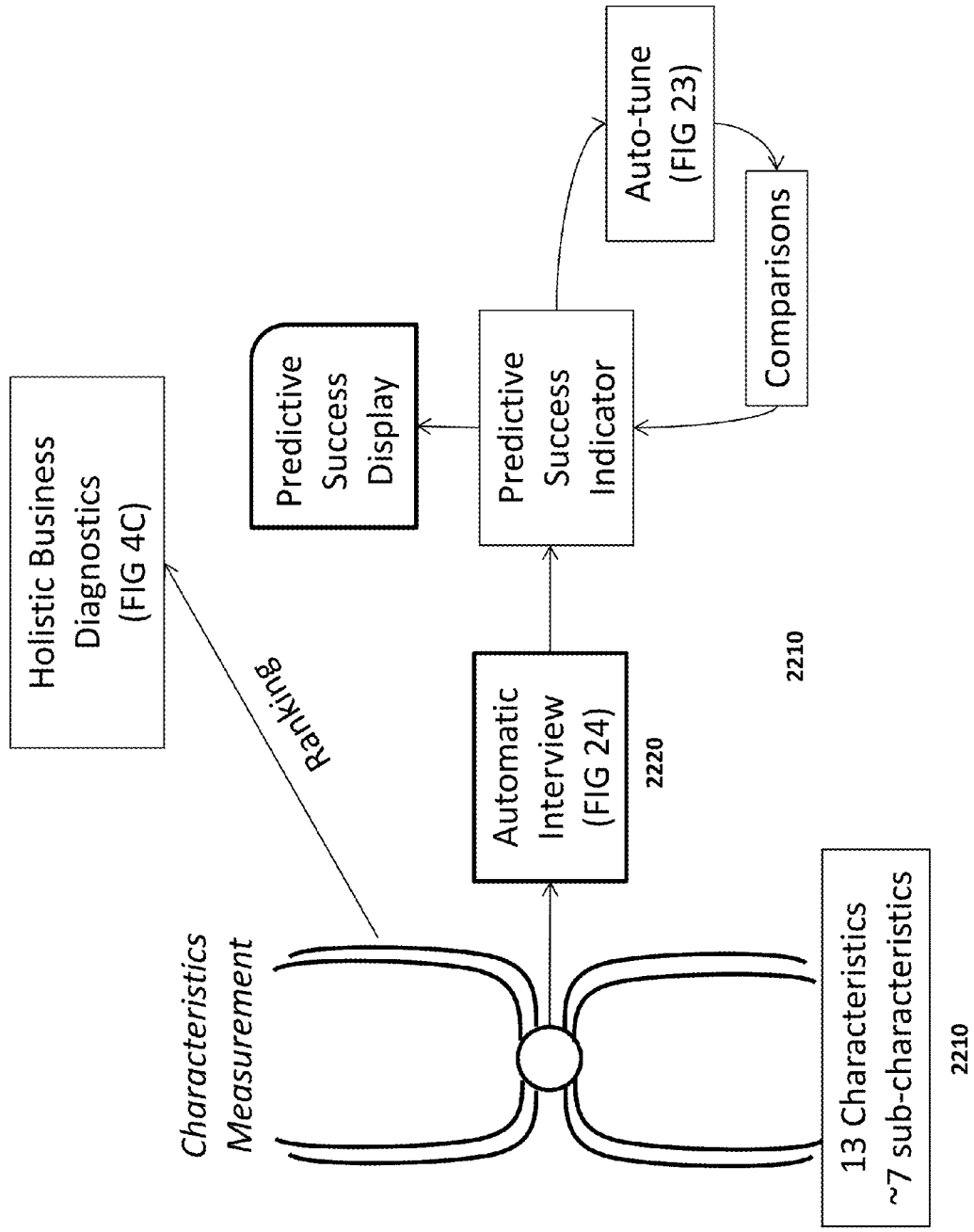
FIG. 22: M13 Hiring

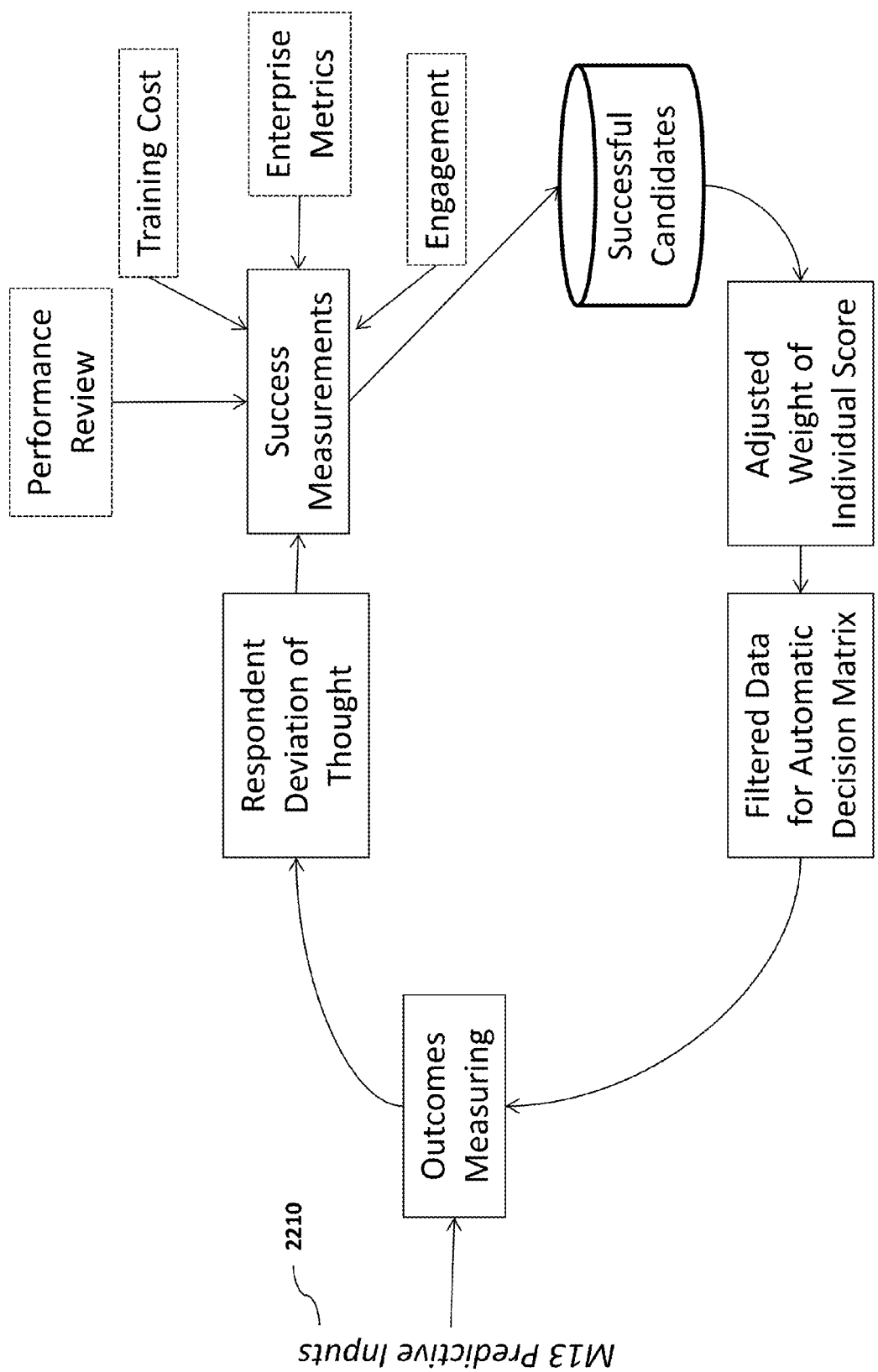
FIG. 23: M13 Auto-Tune

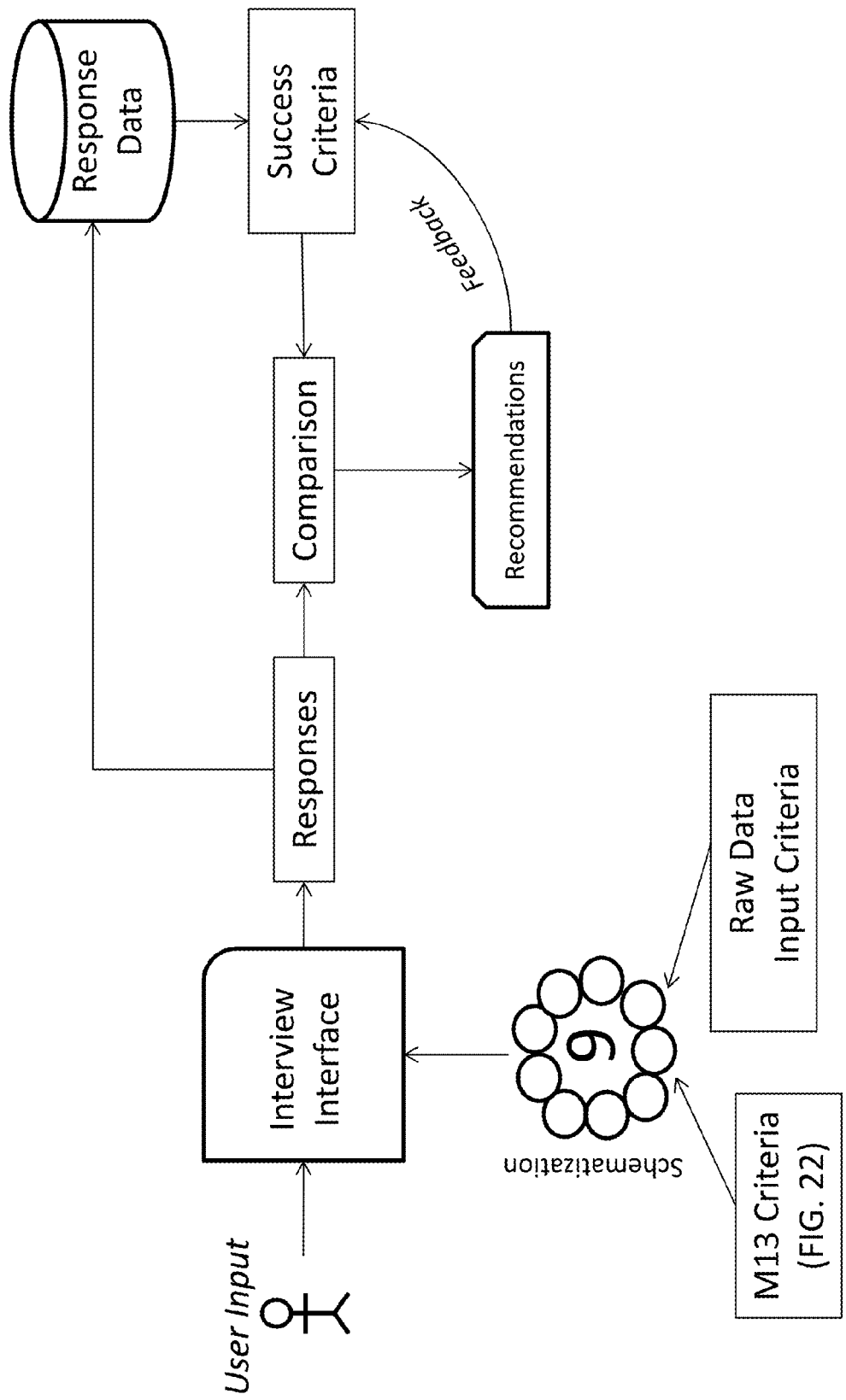
FIG. 24: Automated Interview

SYSTEM AND METHOD FOR OPTIMIZING BUSINESS PERFORMANCE WITH AUTOMATED SOCIAL DISCOVERY

BACKGROUND

1. Field of Invention

The present invention relates to a system and method for identifying and qualifying sources of data, collecting, filtering and analyzing data and transforming the data into visual images associated with a selected framework that is useful as tool for managers to optimize enterprise performance.

2. Background of the Invention

Since the mid-20th century, the field of business and management has revolutionized business and industry. Beginning with consultants such as Peter Drucker and W. Edwards Deming, numerous authors and consultants have suggested frameworks for analyzing an enterprise to give management insight and provide tools to improve performance through, for example, enhanced clarity of roles, responsibilities, and expectations. Numerous "frameworks" have been suggested since that time, but the lack of systematic approach to gaining insight into all areas of an organization diminishes the usefulness of these frameworks.

Two distinct methodologies are commonly used to measure organizational effectiveness and collect information on the functional performance of business processes: outside business consultants and internal review processes. This approach to gaining insight into an enterprise is disconnected and disorganized.

When performance is measured based on external perspectives from consultants, individuals or a team conduct interviews of key executives in a company, review financials, and compare results to their established methodology. Expertise generated by consultancies is based on soft variables and subjective information provided by the consultancy. The actual methodology of consulting varies widely due to different established practices, varied strategic differences between internal opinions provided within the business community, and different institutional philosophies constructed on a variety of experiences uniquely shaped by the circumstances the individual consultancy encounters during their operation as a functional business. Consultancies produce results based on their varied methodologies and then provide executive recommendations based on their private findings. Typical consulting fees are quite expensive. This makes consultation an unattractive option for business managers unless they are forced into unfortunate circumstances that inhibit their operations or their strategic position is compromised in their own space within their operational market. In addition, the "learning" and recursive benefit that comes from in depth analysis of different organizations inures almost entirely to the outside consultants. Stated differently, the more engagements a consultant takes on the wider their knowledge base becomes. Learning form the best practices of one organization allows a consultant to better advise another organization with regard to benchmarking or best practices. However, the ability to share and benefit from this increased insight is controlled by the outside consultant. Moreover, protection of know how relating to best practices depends on the outside consultant. Organizations would plainly benefit from being able to capture for themselves some of these side benefits of in depth organizational analysis. Likewise, systemized benchmarking (as opposed to human benchmarking) improves the ability to control the dissemination of know how.

Business management might also choose to investigate optimization options by establishing internal review processes. Internal processes that businesses use to conduct performance reviews tend to be broad and disparate. An individual business might use performance reviews ranging from strategic off site based internal executive team evaluations to internal employee surveys. The variance among separate business entities is not of itself problematic. However, it is often the case that an individual business utilizes completely separate methods for collecting information. Initiatives typically target separated issues based on entirely different points of strategy. Data collection and management can also vary greatly. These methods are all disconnected from an overall perspective and lack organized means of comparing the performance of each method. Since these different methods cannot be universalized, it is difficult to examine the strategic importance of the information.

The absence of a systemized approach to data collection limits the ability to use the data to gain enterprise wide insight. Most data collected through consultants and internal review, assuming it is even translated into useful strategic insights for the business, is eventually neglected as of little value beyond the narrow case for collection. The disparate nature of the information means further limits the value of the data gathered in conventional internal review processes. Since there is no existing framework for organizing all of the information, none of the respective pieces of data have any larger meaning for the business. There is no methodology for universalizing the information to the broader implications of the business itself. Generated connect insights is difficult, if not impossible, with disconnected data.

Thus, there remains a need for a system and method for identifying, gathering and transforming useful data into a desired framework.

SUMMARY OF THE INVENTION

The present invention provides a system and systematic approach (method) for identifying and qualifying sources of data, collecting, filtering and analyzing data and transforming the data into useful output (e.g., visual images and print outs) associated with a selected framework that is useful as tool for managers to optimize enterprise performance. As used here, a "framework" is an analytical structure for organized presentation of data that encompasses the assets, processes and structures that drive business success. Embodiments described herein refer to Edwin Miller's 9Lenses framework, but the invention may be applied to other frameworks as well. An embodiment of the present invention provides a system, methods, processes, software, and standards designed to collect and collate information pertaining to the condition particular to the company that concern the successful operation of the company evaluated.

A challenge encountered by business leaders seeking to utilize a framework, (e.g., 9Lenses) is that data within and available to the organization is not directly applicable to the framework. Moreover, data that may be relevant or necessarily is not being collected. The invention provides a system and systematic approach for identifying, collecting and transforming available data into framework data. The system takes input from a wide variety of data sources, transforms the data by processing the input as necessary and mapping the input to a MAIN SCHEMA using a mapping engine. A transformation engine (analytics engine) may be used to transform or assist in transforming the MAIN SCHEMA data into a selected output framework (Business Context). The presentation format may be a "preset" format related to known or established business context or customized to meet a particular need.

The input data sources used may include both people providing input in response to surveys or data pulled from existing internal or external data sources. The people from whom data is obtained can be anyone connected with the enterprise: employees, managers, customers, vendors and any other stake holder. Existing internal data sources could include, for example, Enterprise resource planning (ERP) systems, human resource (HR) systems and operational systems. External data sources could include, for example, market intelligence and competitive rankings.

The output of the system, methods, processes, and software can be displayed (presented) in a format tailored to address specified problems based on criteria of assessing (1) immediate business pains (2) specific areas of concern (3) scope of the problem (4) potential returns for solutions to the problem. Information is then classified according to business complexity and immediate needs. Selections of the specific systems utilized under the framework are based on company preference, but recommendations are provided based on the inputs provided by the company. The raw data is persevered in association with the transformed data and the presentation of the data is hierarchically structured so that a user may see all available data at the highest transformed data level and then "drill down" into progressively lower levels so that raw data is at the lowest level of the hierarchy.

The output of the system, methods, processes, and software may include presentations of data transformed and applied according to a selected schema and may include the output of one or more software engines that provide useful business tools. For example, a recommendation engine may be provided to make recommendations based on the data and the selected schema. Likewise, a prediction engine may be provided to make predications based on the data and the selected schema. A comparison engine may be used to take system output and compare the output to a standard for that industry using a database that stores ideal metrics of that industry, i.e., compare actual to ideal. Based on signals from the comparison engine, the system may provide a visual signal [e.g., "red" "yellow" "green" display] to identify where the data presented lies on the spectrum of comparable organizations. Additionally, the comparison engine may provide recommended action-steps for using the data in strategic plans. A valuation engine may be used to generate a valuation of the enterprise based on the data.

The system also includes data filters that, for example, allow a user to turn off selected segments of data from the inputs. The segmentation of the data is based on preset organization of the data. This functionality allows the system to display outputs based on different combinations of segmented data from the inputs.

The present invention is applicable to a wide variety of business problems. Utilization can theoretically apply to any company operating with a multiplicity of employees, operations, functions, and systems. Meaningful insight is derived from the collection, development, and transformation of data based on the inputs, data aggregation, and systems. Outputs regarding the aforementioned problems functionally operate under the mechanism of the system logic (schema) in regard to how data is transformed into useful insight driving materials.

The tools provided by the invention may be applied to all business problems that can be articulated in a known context for procedural evaluation. Areas of application broadly concern market potential, market behaviors, competitor interests, human resource solutions, organizational design, financial resource management, business planning strategy, marketing planning, sales strategies, operational considerations, infrastructure planning, operational assessment, potential returns for investments, measures for assessment, performance assessments, stakeholder investigations, governance practices, and legal concerns. These issues all fit into the 9Lenses framework, called the schema. The invention develops solutions based on this framework.

Business problems under the framework function as points of evaluation. Points of evaluation are deployed in the system based on the working methods established. The specific systems, methods, processes, software, and standards utilized break down based on the workflow of the issue classification. Aggregated data functionally overrides strategic evaluation difficulties by automating data collection and transforming the simple data points into meaningful information with direct application to immediate concerns as well as applications to future problems. Additionally, by providing contextual understanding of comprehensive organizational structure, the data functions as a conceptual insight engine. Data aggregation reduces the operational and opportunity costs of strategic assessments while maximizing the valuation and visibility of potential solutions.

BRIEF DESCRIPTION OF DRAWINGS

FIG. 1 is a schematic diagram illustrating the architecture of the system.

FIG. 2 is a schematic diagram illustrating the functional overview of the system.

FIG. 3 is a process flow for how data in the system is transformed into actionable enterprise intelligence.

FIG. 3A is an illustration of a main schema and the accompanying output of from the system dashboard.

FIG. 3B is an illustration of an alternative output from the system dashboard.

FIG. 3C is a illustration of the description of the main components of a main schema.

FIG. 4A is a schematic diagram of an exemplary system for transforming various inputs of raw data into useable information within the schema.

FIG. 4B shows an aspect of the invention that allows the user the ability to control data outputs.

FIG. 4C is a schematic diagram of the system used to measure various inputs and determine comparative analysis of the entire business operation FIG. 5 is a schematic diagram of an exemplary system used in a process for evaluating and confirming business data inputs based on interpretative logic grounded in dynamic feedback loops.

FIG. 6 is a schematic diagram of an exemplary system for collection, organization, schematization, storage and use of queries designed to elicit data pertaining to business problems into a universal database.

FIG. 7 is a schematic diagram of an exemplary system and process for selection of individuals to participate in a business initiative based on a process using a/b testing to determine expertise on information for the purpose of planning and segmenting participants.

FIG. 8 is a schematic diagram of the prediction engine used in predicting outcomes from separate business problems.

FIG. 9 is a schematic diagram illustrating the system used for aggregating business data and automatically publishing content to specified users.

FIG. 10 is a schematic diagram of an exemplary system used based on a decision engine for automatically generating diagnostic queries for business problems and then refining the automatically generated apps.

FIG. 11 a schematic diagram of an exemplary system for collecting systems data into the interpretation and scoring logic system and aggregating the data and building it into the schema.

FIG. 12 is a schematic diagram of the system used in a process for collecting assorted public (external) data and systematizing the information based on an interpretative scoring process and sequencing it into a logical framework.

FIG. 13 is a schematic diagram of the system for generating specific population lists to be queried based on pre-determined inputs that in turn generate an automatically selected population for sessions based on determinant algorithms and comparisons.

FIG. 14 is a schematic diagram illustrating an exemplary system used for creating business solutioning ideas within the organization.

FIG. 15A is a schematic diagram of an exemplary system for presenting output according to an alternative schema format based on a master schema.

FIG. 15B is a schematic diagram illustrating an example of a system from presenting translated content from alternative schemas into a format based on a master schema.

FIG. 16 is a schematic diagram of an exemplary system for automatically recommending business conversations based on the data obtained from the holistic business diagnostics.

FIG. 17 is a schematic diagram of an exemplary system that automates meetings.

FIG. 18 is a schematic diagram of an exemplary system that monitors inputs to generate recommendations and report on changes.

FIG. 19 is a schematic diagram illustrating an exemplary system used for matching consultant-generated solutions concerning specific enterprise related issues.

FIG. 20 is a schematic diagram illustrating an exemplary system for using data inputs vetted through established protocols to determine bid decisions for contracts.

FIG. 21 is a schematic diagram illustrating an exemplary system for measuring the financial model of an enterprise.

FIG. 22 is a schematic diagram illustrating an exemplary system for automatically calibrating the predictive success from automatic interviews based on successes of previous candidates.

FIG. 23 is a schematic diagram illustrating a process of automatically calibrating the automatic hiring determinant system based on successes of previous candidates.

FIG. 24 is a schematic diagram the system used for process responses from automated interviews.

DETAILED DESCRIPTION

An embodiment of the present invention provides a broad system for business optimization by presenting data according to a selected schema. The data presented according to the schema is generated by transforming data received into schema data according to a selected schema.

I. Core System Logic

FIG. 1 is an overview of the system architecture. As shown, the system includes a communications system 100 for network communication with a plurality of data sources. A query engine 110 is connected to the communication system for requesting data from the data sources. The data sources include external data sources that communicate with the system through the Global Information Network (GIN) and internal data sources in direct communication with the system. Examples of external sources include data feeds 122 that provide market intelligence or other news and inputs from social media or outside sources made through communication devices such as mobile phones 124, tablet computers 126 and other computers 126. Examples of internal sources include the CRM system 132, HR Database 133, CRP System 134 as well as user inputs through computers such as tablets 136 and other computers 138. A database 140 stores data received from the data sources and a schematic interpretation engine 150 engine transforms data in the database 140 to master schema data according to a selected schema. The system may also include an engine for transforming the master schema data into data for alternative schemas and allows customized schemas. Various displays 170 may be used to display data in a format dictated by the selected schema. A user interface 160 allows a user to control the display. The hardware used to implement the system preferably includes at least one CPU with on board RAM; an input/output system bus (including control bus, address bus and data bus functionality); system memory; system storage (flash or hard drive); communications hardware for TCP/IP (or other protocol) based end-to-end connectivity and a wireless communication processor for enabling Wi-Fi, Bluetooth and/or other wireless data exchange over a local or global information network.

FIG. 2 shows a functional overview of the system. As shown, the data from External 120 and Internal 130 sources is aggregated 210 and passed to an interpretation engine 230 for transformation into schema data according to the selected schema 310S (in this example the 9Lenses schema). The data is then selectively displayed as system output 310D. The function of the invention is divided by two categories, (1) the fundamental logic of the system that drives the data collection, storage, transformation, and dissemination and (2) the extended uses of the systems logic in a plurality of subsystems.

FIG. 3 shows the process flow for data transformation according to the invention. As shown, the process beginning at step 300 includes the step 310 of selecting a schema, which is described in greater detail below. At step 315, the components and sub-components of the selected schema are defined. The defined components (and their sub-components) are the characteristics of the enterprise that are to be evaluated according to the schema. A challenge arises in that there is rarely (if ever) a single data source within an enterprise that provides a complete measure of a component used according to an established schema. Thus, it becomes necessary to transform available data into data that provides the desired evaluation of a component according to the selected schema. At step 320, an available data source that is relevant to one or more of the schema components is identified. At step 325, a strategy for collecting the relevant data is designed and implemented and the relevant data is collected and stored at step 330. The process is repeated (step 327) so long as there are relevant data sources. At step 333, a determination is made as to which of the components or sub-components each data source is relevant to and at step 335 the importance of the data to a component/sub-component is defined by a weighting factor assigned to each data source. At step 340, a weighting factor is assigned to each subcomponent to reflect the relative importance of that sub-component to the component being measured. The weighting factors associated with data sources are preferable dynamically adjusted based on previous users responses from a particular participant and past performance. For example, the input of a particularly insightful data source (participant/respondent) may be given more weight, while a less insightful data source may be given less weight. A dynamic data weighing engine may be used for this purpose. At step 350, the system displays the component level results (as shown, for example, in FIGS. 3A and 3B) and the user is provided with the option (though user interface 160) to display the underlying constituent data, i.e., drill down to see the subcomponents and data that resulted in the overall result. At step 360 users are provided the option for considering specified sub-sets of the data (from step 333) apart from the aggregate data provided by the system. Users can select specific data from specified sources. At step 363, in response to the users' selections, the system removes one or more data sources from the calculation and reweights the remaining data sources 365. The system also provides the user with the option of outputting data from the system (at step 370) and allows the user to select an output format (step 375).

The step 310 of selecting a schema involves selecting an analytical structure for organized presentation of data that encompasses the assets, processes and structures that drive business success. By way of example, FIG. 3A shows the 9Lenses framework 310S and one example of an output display 310D of transformed data. In the 9Lenses schema, the components defined (step 315) are the 9Lenses (strategy, execution, operations, expectation, governance, entity, market, people and finance). The sub components are the "sub lenses" of the 9Lenses schema. FIG. 3B shows an alternative output that provides a more through overview of the data at the component level.

As shown and explained in FIG. 3C, the 9Lenses components provide insight into the assets, processes and structure within an enterprise. In this regard, the market, people and finance lenses may be grouped under the category "assets." The strategy, operations and execution lenses may be grouped under the category "processes." The expectation, governance and entity lenses may be grouped under the category "structures." Other schemas typically use different labels for the different components and sub components used to provide insight into an enterprise. However, in accordance with an aspect of the invention, the component data for one schema (e.g., 9Lenses) may be transformed into and presented as component/sub-component data for another schema using a schema conversion process, one example of which is described in FIG. 15 below.

FIG. 4A shows the system used for transforming various inputs from raw data into usable information within the schema. Although FIG. 1 depicts the process at a high level as occurring in a schematic interpretation engine 150 that is in communication with other system components and the user interface 160, the process may occur at various locations based on various inputs. The process steps employed in the transformation of raw data into schema data comprise: collection of raw data; classification of raw data; assignment of data that has been classified; weighting of data and application of data to the schema components/sub-components.

As shown in FIG. 4A, the raw data that has been collected is classified (step 410) according to, for example, data type: active 412; passive 414; binary 415; scaled 416 and user generated 418. At step 420, the data is then assigned to one or more components/subcomponents of the schema and a weighting factor is determined for the data with respect to each component/subcomponent. The previous classification (412-418) is preferably a factor in determining the weighting assigned to data (step 420). At step 430, the transformed data is then applied to the selected schema. Preferably, the transformed data sources are each assigned to a subcomponent with a respective weighting factor and the subcomponents are given a weighting factor for their respective component. Once transformed data is applied to the schema and appropriately weighted, the system can output schema data in various forms according to user preference at step 440. For example, the data may be displayed in the "dashboard" format depicted in FIG. 3A or 3B or output to another program or application or a printable format.

As shown at 470 in FIG. 4A, the system may also use transformed schema data to generate and output action step guide outputs such as recommendations 473; industry benchmark comparisons 474; red flags 475 and people analysis 476. In this way, the system leverages the transformed data to provide additional tools in the form of reports and indicators based on more accurate and up to date data than would otherwise be available. For example, the industry benchmark feature allows comparison of an enterprise's performance to other enterprises in the industry. Importantly, the system allows such comparisons even among companies that select different schemas because of the ability to interpret data from other schemas.

FIG. 4B shows an aspect of the invention which allows the user to control, through the user interface 160, data input and weighting to permit segmentation and analysis of the degree of impact of departments or sectors and analysis according to one's own view as to the significance of particular business relevant data to business issues. As shown at 480, the system includes control switches to allow the user to enable and disable inputs used to generate the system output along the lines shown at 360 in FIG. 3. As shown in FIG. 3, when data inputs are disabled, the system reweights remaining data sources 365 and generates revised output. The system further includes a weighting control feature 482 that allows the user to override the default weighting in defining the weighting for a data source (step 335). The system generates revised output based on the new weighting so that the user can see the impact of the change in weighting.

FIG. 4C shows the system used to measure various inputs and determine comparative analysis of the entire business operation. As shown, the system is similar to that of FIG. 4A and system exclusive data is depicted as distinct from public and or enterprise data that is used for purposes other than the system per se. System exclusive data is data that is, in the first instance, generated or collected expressly for the purpose of inputting into the system, e.g., responses to system queries. As shown, the system includes an interpretation and comparison engine 478 performs comparisons across data sets to provide additional views and recommendations based on the transformed data. An example, described below in connection with FIG. 8, is the predictive analysis of predicted outcomes of business problems.

FIG. 5 shows the system used in a process for evaluating and confirming business data inputs based on interpretative logic grounded in dynamic feedback loops. By way of example, when data input is based on human input (e.g., response to a system query), the interpretation logic engine 520 evaluates the response against previous responses 522, public data 523 and systems data 524 to identify a possible inconsistency, incongruity or anything else that might indicate erroneous input or enterprise inconsistency. When a possible error is identified, the dynamic confirmation engine 525 seeks confirmation of the data input by, for example, sending a query to the data source. Information from the interpretation logic engine may be viewed as a single instance (static view) or as a dynamic view and the system generates recommendations to remedy the detected error or inconsistency in data input. This aspect of the invention is especially important in detecting instances where a single input source may have relevant information that is unknown to others and separating such instances from mere errors in input.

FIG. 6 shows the system used for systematic collection, organization, schematization, storage and use of queries designed to elicit data pertaining to business problems into a universal database. The system includes a diagnostic input 610 for receiving a new diagnostic query from a user or agent. The diagnostic is then schematized 620, i.e., a record is created as to which components/subcomponents of the schema the query is relevant to. In addition, a record may be created as to whether the query is enterprise (client) specific or generally applicable. If the query is enterprise specific, it is passed to a diagnostic creation interface where it is processed as an enterprise diagnostic for use in an enterprise app. The query is then evaluated (at step 640) for general applicability and if found applicable (perhaps with modification) for general use, the query is passed to the central repository 670. If the query is not generally applicable, it is stored in the Enterprise Repository 650. Queries stored in the Central Repository 670 may be displayed by the diagnostic library display 680 and also used to create apps using the app creation interface 690. In this way, the system permits intake of individual diagnostics that are then transformed into queries that elicit interrelated information based on a logical framework for compilation into business diagnostics. The individual diagnostics may be transformed into apps (using the app creation interface 690) for the purpose of assessing business problems.

By virtue of the transformation and organization of data according to a schema, stored data may be used for other purposes. For example, FIG. 7 is a schematic diagram of an exemplary system and process for selection of individuals to participate in a business initiative based on a process using a/b testing to determine expertise on information for the purpose of planning and segmenting participants. A shown, a system query 701 initiates the A/B test process 710. The A/B test process takes into both performance assessment 720 (based on desired resource commitment 721 and probability of success 723 given the desired resource commitment) and influencing factors 725 regarding the proposed app. A logic module 730 processes the inputs and outputs segmentation 750 and resource planning data 770. Segmentation 750 defines the role, organization, tenure or other characteristics of personnel suited for the task. Resource planning 770 outputs the availability of personnel and the enterprise impact of assigning available personnel.

FIG. 8 shows the prediction engine used in predicting outcomes from separate business problems. Predictive analysis begins with aggregated responses from schematized responses from participants 810. Based on predetermined connections, the prediction engine takes actual responses around specific components and sub-components 822 and predicts responses to other schema queries 824 that have established connections to the queries 822 for which actual responses have been received. As shown, a cross comparison engine 830 uses the actual responses 822 together with Historical Response Data 840 to provide inputs to a predictive estimation engine 850 that generates a prediction of the response to schema queries 824 that are known to have a predetermined relationship to the actual responses 822. Once the predicted responses to queries 824 have been generated, the system will prompt the user at 860 to validate the predicted response, e.g., confirm the predicted responses or provide new input. The results of the prediction are stored in the predictive database 870 and used as an input to refine future predictions by the predictive estimation engine 850. Preferably, the validation step 860 occurs as a separate user session to allow a more comprehensive response to specified business problems. In other words, the validation step is more than just a data input validation, but provides an opportunity to elicit important data used within the schema in a systematic way that is more efficient and focused because it is based on information already known to the system. The predictive analysis system of FIG. 8 thus acts as an intelligent agent to improve user input queries (at the validation step 860) though the use of predictive estimation.

II. Functional Extension of Core Logic

FIG. 9 shows the system used for aggregating business data and automatically publishing content to specified users, in this case enterprise board members. At step 910 a determination is made as to which subset of data will be provided to the user. The selection is input to a data-filtering engine 920, which flags the relevant data fields. The automated data selection engine 930 generates an automated Relevant Data report 940 periodically or whenever a threshold of new data in the flagged fields has been received.

FIG. 10 shows the system used based on a decision engine for automatically generating diagnostic queries for business problems and then refining the automatically generated apps. As shown, the system includes a decision engine 1010 that allows priorities to be set according to enterprise organizational profile 1012 (industry, size, growth, inflection points) and preferences 1014 with respect to features such as time to completion, expertise required, source providing resources and area of focus (e.g. operations, execution etc.). The output of the decision engine 1010 together with the diagnostic library 650 and/or 670 and optionally the output of the automatic population engine of FIG. 13 are aggregated 1020 as inputs to an automated app generation engine 1030 that generates an automatically generated app 140 composed of diagnostic queries selected from the repositories 650, 670 based on the output of the decision engine 1010. The automatically generated app may then be evaluated by the user at the diagnostic rating step 150 preferably though a diagnostic-by-diagnostic assessment that results in a refined app 170. The refined app 170 is then subject to active monitoring (according to FIG. 18) to continuously refine the app 170.

FIG. 11 is a schematic diagram of an exemplary system for collecting systems data into the interpretation and scoring logic system and aggregating the data and building it into the schema. As shown, internal data 130 that is not system exclusive is transformed into schema useable data by assigning a schema useable score to the data. The score is assigned by an interpretation scoring engine 1110 pursuant to the selected schema (e.g., a score of 1-9) based on predetermined conversion algorithms or tables. The scores are then input into schema specific locations at step 1120 and applied as diagnostics input 1115 to diagnostics from the enterprise repository 650 for use in system output 1130 such as data interpretation, company reports and data feedback.

FIG. 12 shows the system used in a process for collecting assorted public (external) data 120 and systematizing the information based on an interpretative scoring process and sequencing it into a logical framework. As shown, external data 120 is transformed into schema useable data by assigning a schema useable score to the data. The score is assigned by an interpretation scoring engine 1210 pursuant to the selected schema (e.g., a score of 1-9) based on predetermined conversion algorithms or tables. The scores are then input into schema specific locations at step 1220 and applied as diagnostics input 1215 to diagnostics from the enterprise repository 650 for use in system output 1230 such as data interpretation, company reports and data feedback.

FIG. 13 shows the system for generating specific population lists to be queried based on predetermined inputs that in turn generate an automatically selected population for sessions based on determinant algorithms and comparisons. As shown, a parameter selection interface 1310 allows the user to set parameters based on factors such as segmentation, previous participation (and performance) and weighting of criteria. Based on the parameters set and data drawn from a HR database 1320, an automated selection engine 1330 generates a population selection report 1340 for user review at step 1350. If the report 1350 is approved, it is used in an app session at step 1360 and eventually results in a statistical report 1370. If the report is not approved at step 1350, the user selections participants to be removed and the process returns to the automated selection engine 1330.

The system shown in FIG. 13 may thus be used for automatically calculating a statistically significant population for addressing specific business problems. Likewise, the system may be used to invite the statistically significant population to an application, and determine their representative perspective based on relative calculations of the deviation of initial population participants. The system acts as a decision engine that uses relative A/B testing preferences to determine significant issues and workflows for determining which populations are expert in which topics.

FIG. 14 shows the system used for creating business solutioning ideas within the organization. The system solicits uncollected ideas from employees 1405 and includes a repository 1410 for storing and processing the ideas. The data is schematized at step 1420 and at step 1430 the idea is approved or rejected (presumably by a manager). If approved, the idea may be reformatted and rated as an output proposition 1440 for further consideration and rating. A logic module 1450 includes algorithms for selecting best comments/ideas, thumbs up/down rating for manual rating, algorithm for aggregating responses; use of the best data to determine consistent performance. Output from the logic module 1450 may include, for example, benchmarking reports, top comment reports and idea comparisons. The system further includes feedback loops for identifying and relating top solvers and best ideas to predictive solutions. As shown, ideas are associated with the individuals submitting them in an Individual Report 1460 and validated (or not) through future data and reports are generated on an entire session 1470. User data is also stored in an enterprise repository 1480 and used to identify top performers based on submissions over time. Process steps may be performed by software engines, agents or a combination of both.

FIG. 15A shows the system for presenting output according to an alternative schema format based on a master schema. In the example shown, the master schema is the 9Lenses schema. As shown, the user selects an alternative schema at step 1510. An analysis agent defines the components and sub-components of the alternative schema at step 1515. The agent then maps the components and subcomponents of the alternative schema to the master schema (step 1520). In addition, at step 1525 the agent identifies externalities, i.e., inputs required by the alternative schema that cannot be mapped from the master schema. To the extent externalities exist, it becomes necessary to define and implement a data collection strategy to satisfy the externalities. At step 1530, an available data source that is relevant to one or more of the schema components is identified and a strategy for collecting the relevant data is designed and implemented. The relevant data is collected and stored at step 1540. The process is repeated (step 1550) so long as there are relevant data sources. It will be appreciated that the agent described above maybe an automated software agent, a human agent or a combination of both. Once externalities are fully satisfied, the proposed mapping and internal systems information are presented for review and approval at step 1560. If approved, mapped content is output at step 1570. If not approved, a reason for rejection is obtained and the system revalidates the proposal (at step 1580) and the process resumes at 1525.

Similarly, FIG. 15B shows an example of a system for extracting and presenting translated content from alternative schemes into a format based on a master schema. In this example, the analyst agent translates content from a relevant book on business expertise 1505 according to the collection of external research 1513 and previous information on the development of business procedures 1515. The resultant diagnostic 610 is translated into a master schema 1520. At step 1530, the agent generates a refinement of the diagnostic according to pre-established criteria on comparison to known business problems 1533, quality of the language used as it relates to traditionally accepted terminology 1535 and investigative strength of the diagnostic according to the likelihood of eliciting useful responses. The refinement is presented for review and approval 1540. If approved, the diagnostic content is output at step 1560 and then stored in the diagnostic repository 670. If not approved, a reason for rejection is obtained and the system revalidates the diagnostic (at step 1550) and the process resumes at 1530.

FIG. 16 shows a system for automatically recommending business conversations based on the data obtained from the holistic business diagnostics (as shown in FIG. 4C). The system extracts data from responses 1610 to determine the statistically significant misalignment of scores between executives 1620 and specified needs identified by leadership 1630. The system then compares this data with identified areas of concern from previous data 1640. The resulting comparisons of data are output as a proposal for which business problems should be evaluated 1650. Ideally, the system further includes a display with specific data within the schema from which the proposal was generated 1660.

FIG. 17 shows the system that automates meetings. As shown, users create draft agendas 1710 in the system. The agendas are validated 1720 through manual confirmation from other participants and system-generated preferences from system specific data. At step 1730, the system filters the human responses, these responses are then schematized 1740. At step 1750, the system creates areas of importance according to the schema components and sub-components. The system may use active monitoring 1760, further described in FIG. 18, as a feedback loop to confirm the accuracy of the system-generated preferences. The system generates an actions and recommendation report 1770, which users and participants may then validate according to their own preferences. The system may then provide outputs on the validated actions 1780.

As the system collects data from a plurality of sources, the user may monitor the general trends in the usefulness of information that the system collects from different systems. As shown in FIG. 18, the system monitors individual inputs using decision logic modules to generate recommendations on how sources should be weighted. Data from a plurality of sources, 120, 410, and 130 for example, is aggregated 1810, similar to the system in FIG. 2, and passed to an interpretation engine 1820 for transformation into schema data according to a master schema 1830. At step 1840, the user may select criteria for preferences regarding data sources according to the decision logic engine. The system consistently tracks the inputs from the schematized data and the selections made in the engine. The engine outputs recommendations for data weighting 1850 according to the resultant information from the output feedback and the decision logic engine.

FIG. 19 shows the system used for matching consultant-generated solutions concerning specific enterprise related issues. As shown in step 1910, users input solution data based on established criteria (preferably solution implemented, relevant characteristics of consultant, and experience in field). Solutions data may be stored in a database 1920. The system then schematizes the data pursuant the main schema 1930. Step 1940 shows the users generate data on specific enterprise problems. The data is input into a problem-matching engine that associated the specific problem with the main schema 1930 and generates matching recommendations for the solutioning the enterprise problems 1950. The recommendations may then be evaluated by the respective executives managing the enterprise issue 1960. The system uses the feedback generated by the executives to further improve the problem matching engine suggestions 1970. The system then generates a proposed solution report 1980.

The present embodiment of the invention has multiple systems for automating enterprise processes. For example, FIG. 20 shows the system for automating bid/no bid decisions on contracts. Data from existing workflows, ratings from participants, and corporate resource management 2010 is aggregated 2015 and passed into an interpretation engine 2020 for transformation into the main schema 2030. A logic engine 2040 processes the schematized data. The logic engine may then output a bid/no-bid report detailing predictive success from the data. Step 2060 validates the actual decision. Users indicate the wins and losses on specific bid and input reasons for the outcome. The system generates comparative reviews of these reasons for improving the accuracy of future predictions.

FIG. 21 shows a system for automatically determining the financial model of an enterprise. The system pulls data generated from automated interviews 2110, further illustrated in FIG. 24, and system data 2120 targeted around financial information. The system displays an output model of the aggregated information 2130 according to three criteria (touch, volume, and margin). The system compares data from the output model to available industry data within the system and publically available data 2140. The system generates an automated value estimate 2150 that, preferably, provides a "best in class" comparison financial models. The system also displays a benchmarking report 2160 that provides information for strategic improvement of the financial model. The system generates a KPI report 2177 and displays particular action steps 2173 for recommended actions for altering an enterprise financial model.

The system may provide a system that automatically interviews candidates for employment. As shown in FIG. 22, the system queries the user based on pre-determined characteristics 2210. The system then feeds those inputs into the automatic interview engine 2220, further illustrated in FIG. 24. The system is further comprised of a ranking integration for classified data 410, as illustrated in FIG. 4C. The system pulls the resultant data from automated interviews to generate a predictive probability for successful performance of the candidate within the enterprise role according to the predictive success indicator engine 2240 and outputs a display of the results accordingly 2250. The system is further comprised of a self-correcting feedback loop that pulls information from the auto-tuned feature 2260, further illustrated in FIG. 23. The system creates a corrective formulation for comparisons 2270 that feeds into the calculations provided by the predictive success indicator engine.

FIG. 23 shows the system for automatically calibrating the predictive success of job applicants from automatic interviews based on successes of previous candidates. The system pulls user inputs from the pre-determined characteristics 2210. The outcomes measuring engine 2310 provides an approximated value for current user responses by assigning a numerical value to their responses. The system generates a deviation score for estimating how much the respondent differs from the predictive model for a successful candidate 2320. The system compares the deviation score with the results of the success measurement engine 2330, which uses standardized measurements from a plurality of inputs (for example, performance review, training costs, established enterprise performance metrics, and employee engagement). The system outputs the data of successful candidates and stores them in a repository 2340. The data from the repository is further used to adjust 2350 the estimated weighting of scores provided by the outcomes measuring engine.

FIG. 24 shows the system used for process responses from automated interviews. The system displays the M13 criteria 2210 in a standardized user interface 2410. Through the interface, users input responses 2420 to targeted queries. The responses are preferably input into a response database 2430. The system generates a success criteria 2440 preference that marks the data according to the pre-established success measurement categories, as described in FIG. 23. The raw responses and annotated responses and compared at step 2450 and the system outputs the resultant responses for use within the system 2460.

As described above, the system uses various engines and agents to perform specified functions. The engines are preferably implemented as general purpose computing devices controlled by software to perform as special purpose engines. The computing device(s) on which the system is implemented communicate with other system components and external system systems and users through conventional communications, protocols and interfaces. The agents used or interacting with the system may be automated agents or human agents or combinations of both.

The embodiments described herein are exemplary and not intended to be exhaustive of the applications of the systems and methods of the invention.

What is claimed is:

1. A system for presenting data according to the framework of a selected schema, comprising:
   a communications system for network communication with a plurality of data sources;
   a query engine connected to the communication system for requesting data from the plurality of data sources;
   a database for storing data received from the data sources;
   an interpretation engine for automatically transforming the data received from the data sources into schema data according to the selected schema, wherein the selected schema includes a plurality of components and sub-components, and wherein the interpretation engine further maps the data from the plurality of data sources to the plurality of components and sub-components; and a system output engine and user interface for displaying the schema data for the components and allowing a user to access the data from the data sources upon which the schema data is based, wherein the query engine receives a diagnostic including a record as to which components and sub-components of the schema the diagnostic is relevant and requests the data based on the diagnostic.

2. The system for presenting data according to a selected schema of claim 1, further comprising a mapping engine which transforms the data received from the data sources into system-relevant data by automatically categorizing the data received from the data sources according to the selected schema and then applying the data interpreted with the selected schema to a master schema.

3. A system for presenting data according to a selected schema according to claim 1, further comprising a data filter control to allow a user to selectively remove data sources from the displayed schema data.

4. A system for presenting data according to a selected schema according to claim 1, further comprising a database containing industry data and a comparison engine for comparing enterprise data to industry data and displaying a comparison.

5. A system for presenting data according to a selected schema according to claim 1, wherein the data sources include persons responding to initial queries through the communication system, wherein the interpretation engine interprets the responses through the schema to evaluate the responses for consistency with other data sources.

6. A system for presenting data according to a selected schema according to claim 1, wherein the data sources include internal databases responding to initial queries through the communication system, wherein the interpretation engine applies weighting factors to the internal databases indicating an importance of each internal database to each sub-component.

7. A system for presenting data according to a selected schema according to claim 1, wherein the data sources include external databases responding to initial queries through the communication system, wherein the interpretation engine scores external data from the external databases according to the selected schema.

8. The system for presenting data according to a selected schema of claim 1, further comprising a recommendation engine for making recommendations for altering the financial model of a business based upon the data sources.

9. The system for presenting data according to a selected schema of claim 1, further comprising a publication control engine for allowing users the ability to automatically disseminate relevant parameter controlled system data to specified stakeholder groups in a presentation view.

10. The system for presenting data according to a selected schema of claim 1, further comprising an evaluation engine for evaluating a business suggestion submitted from a data source of the plurality of data sources through reference to ratings of the business suggestion and data regarding the data source and a track record of the data source.

11. The system for presenting data according to a selected schema of claim 1, further comprising a logic engine that produces statistical comparisons between business data.

12. A system for dynamically generating presentations of data relevant to a selected business analytical schema comprising;

a communication system comprising hardware that provides end-to-end connectivity according to a communications protocol to allow transmitting and receiving data within the system and between the system and external data sources and users;

data storage for storing data used by the system;

a user interface;

at least one general purpose computer that includes a least one CPU with on board RAM; an input/output system bus; and system memory, the general purpose computer being capable of executing software programs to implement software engines, the computer being in communication with the communication system, user interface, and data storage; the engines implemented including at least a query engine, a schematic interpretation engine, and a data weighing engine, wherein the query engine is connected to the communication system for requesting data from a plurality of data sources, wherein the selected schema includes a plurality of components and sub-components, and wherein the query engine receives a diagnostic including a record as to which components and sub-components of the schema the diagnostic is relevant and requests the data based on the diagnostic, and wherein the interpretation engine and data weighing engine are adapted to transform data received from the data sources into schema data according to the selected schema, and wherein the interpretation engine further maps the data from the plurality of data sources to the plurality of components according to weights determined by the data weighing engine; and a system output engine and user interface for displaying the schema data for the components and sub-components and allowing a user to access the data from the data sources upon which the schema data is based.

13. The system for dynamically generating presentations of data according to claim 12, further comprising a decision engine that receives user selection of priorities and preferences and retrieves stored diagnostics to generate an app including stored diagnostic queries for business-context relevant diagnostics to be deployed to the query engine.

14. The system for dynamically generating presentations of data according to claim 12, further comprising a prediction engine for predicting outcomes from separate business problems, the prediction engine using the data from the plurality of data sources associated with the components and sub-components and predicting responses to other schema queries that have established connections to the schema data.

15. The system for dynamically generating presentations of data according to claim 12, further comprising a conversion system for presenting output according to an alternative schema format based on a master schema, the conversion system receiving a user selection as to an alternative schema and input from an analysis agent that defines components and sub-components of the alternative schema, mapping the components and sub-components of the alternative schema to the master schema, identifying externalities for which the system must collect data from a source that is relevant to one or more of the alternative schema components, and prompting the user to approve a proposed mapping, wherein the system output engine and user interface display the approved mapped content.

16. The system for dynamically generating presentations of data according to claim 15, wherein the agent is an automated software agent.

17. The system for dynamically generating presentations of data according to claim 12, further comprising a data filter control to allow a user to selectively remove data sources from the displayed schema data.

18. The system for dynamically generating presentations of data according to claim 12, wherein the data sources include external databases responding to queries through the communication system to generate business relevant data interpreted through the schema.

19. The system for presenting data according to a selected schema of claim 1, further comprising an app creation interface for creating an app based on the diagnostic.

20. The system for presenting data according to a selected schema of claim 19, wherein the app is an automated interview engine.

\* \* \* \* \*